Figure 4:
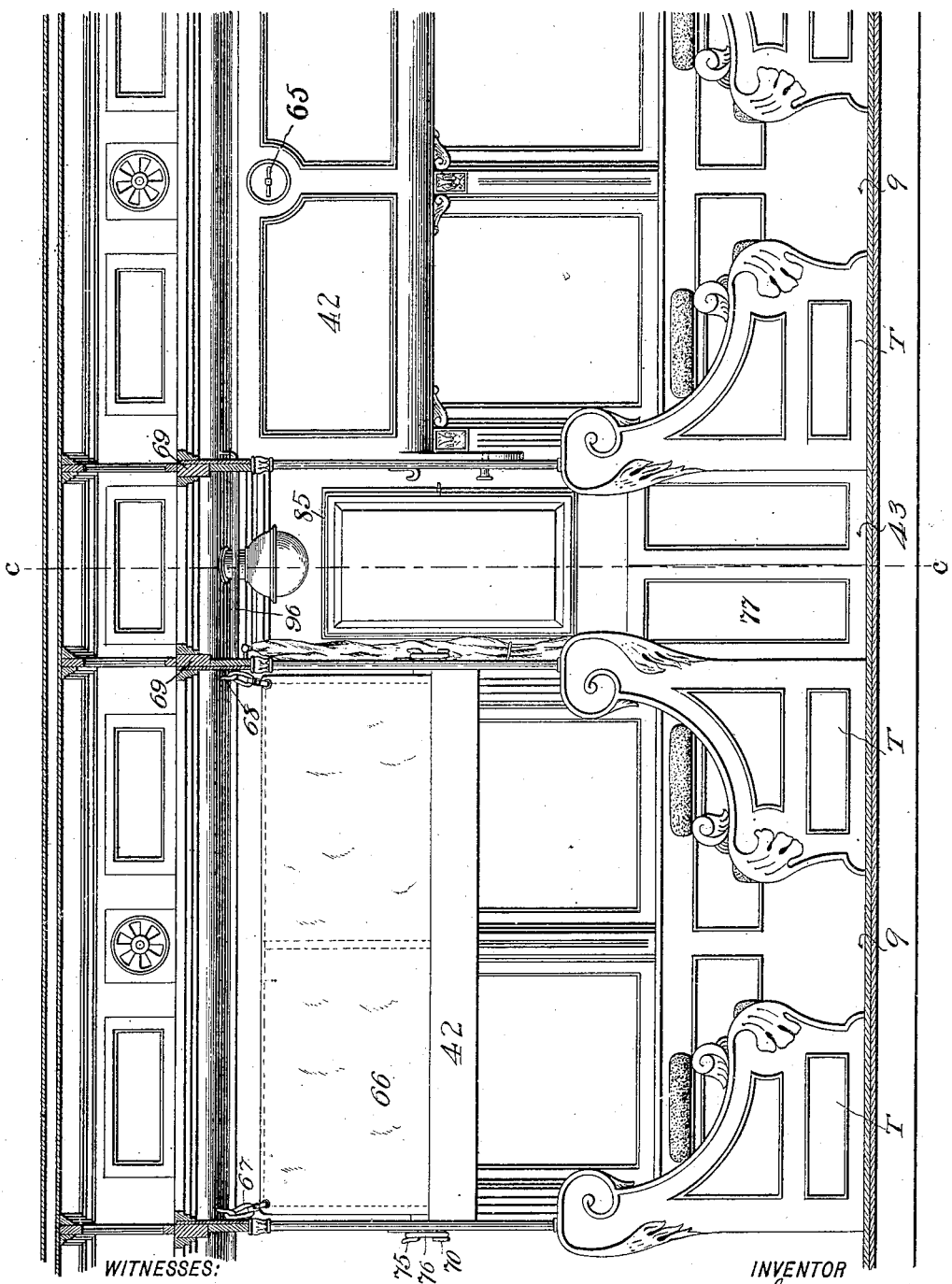

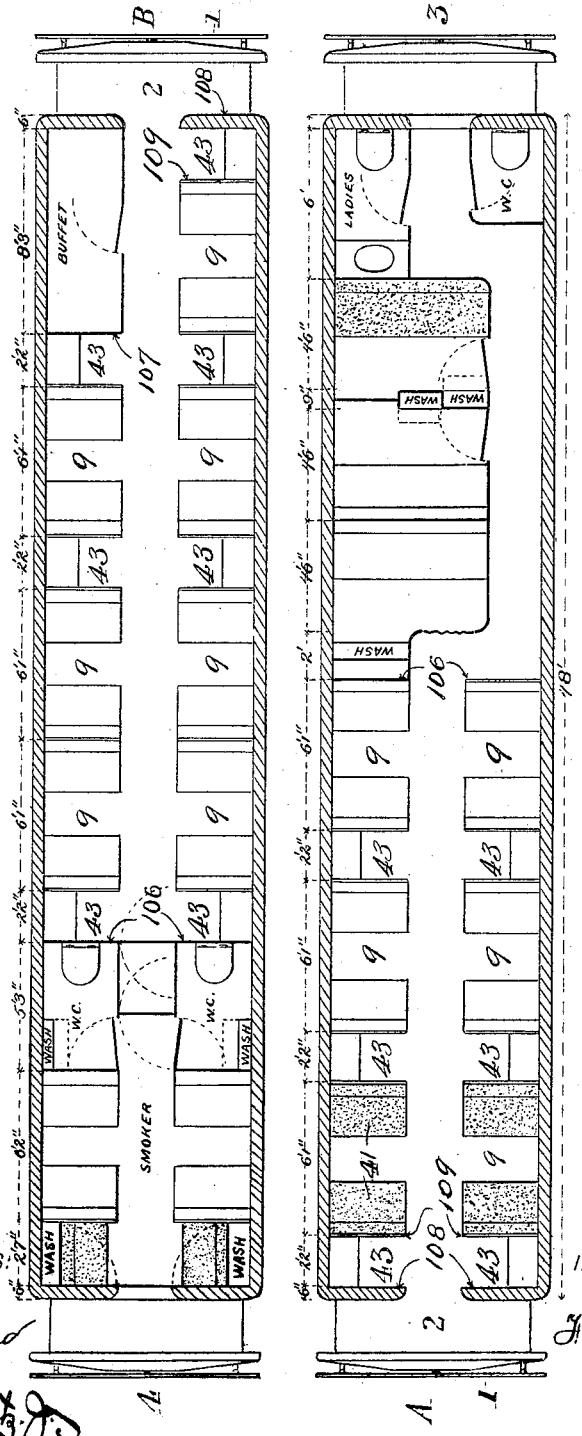

No. 897,315. PATENTED SEPT. 1, 1908.
F. E. STEBBINS.
CAR CONSTRUCTION.
APPLICATION FILED DEC. 24, 1897.
10 SHEETS—SHEET 2.
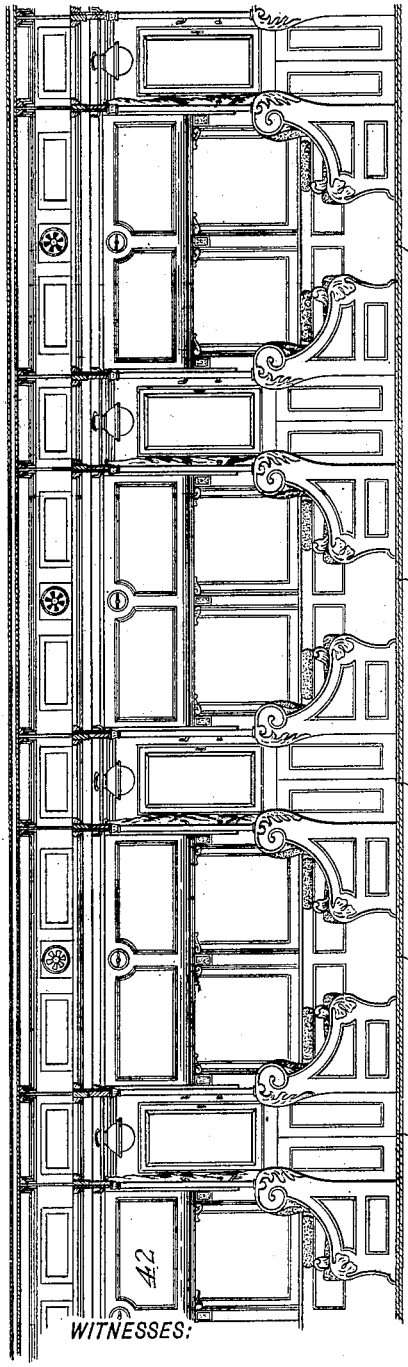
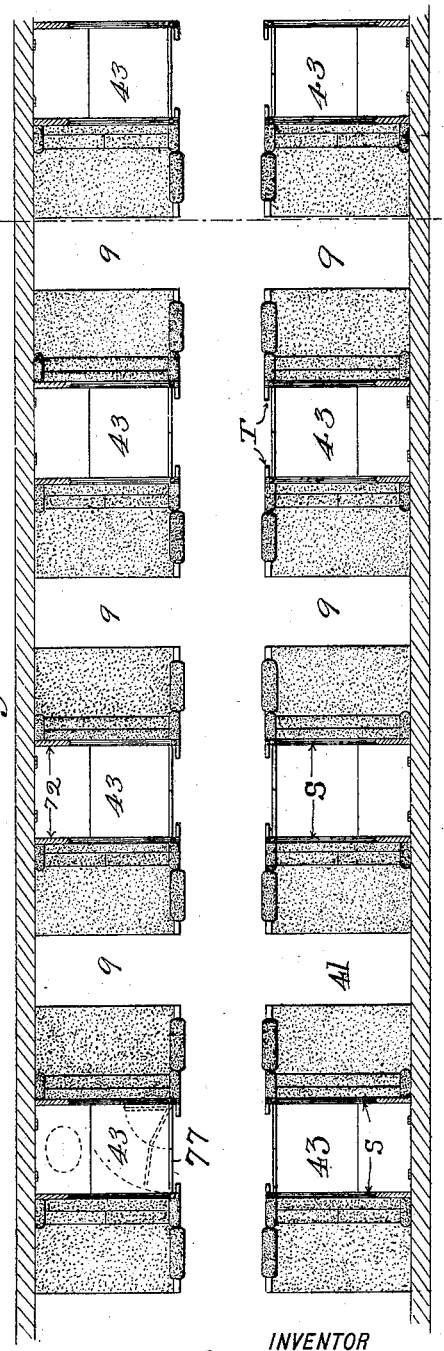
WITNESSES:
Edwin L. Bradford
Wm. G. Steinmetz Jr.
INVENTOR
F. E. Stebbins No. 897,315. PATENTED SEPT. 1, 1908.
F. E. STEBBINS.
CAR CONSTRUCTION.
APPLICATION FILED DEC. 24, 1897.

10 SHEETS—SHEET 3.

WITNESSES:
Edwin L. Bradford
Wm. G. Steinmetz Jr.

INVENTOR
F. E. Stebbins.

No. 897,315.  
F. E. STEBBINS.  
CAR CONSTRUCTION.  
APPLICATION FILED DEC. 24, 1897.

PATENTED SEPT. 1, 1908.  
10 SHEETS—SHEET 4.

WITNESSES:

INVENTOR

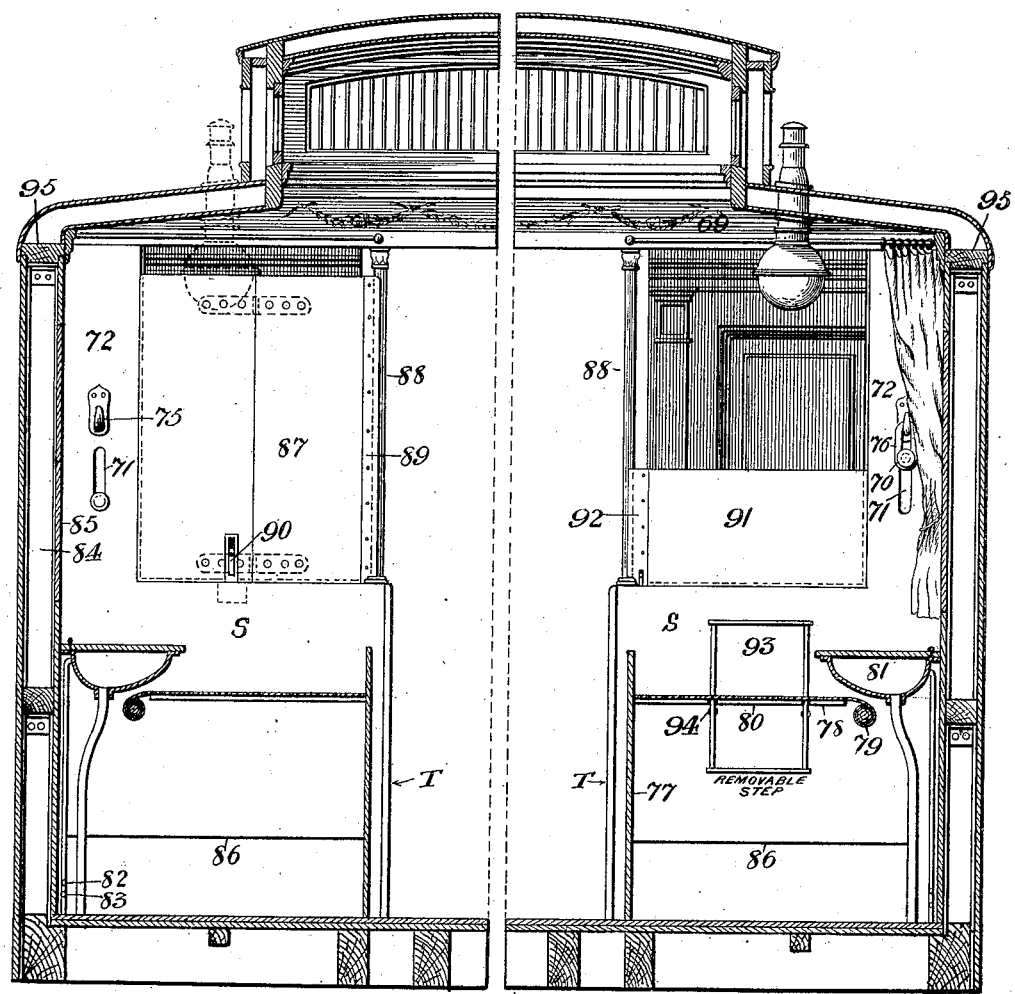

No. 897,315.
F. E. STEBBINS.
CAR CONSTRUCTION.
APPLICATION FILED DEC. 24, 1897.
PATENTED SEPT. 1, 1908.
10 SHEETS—SHEET 6.
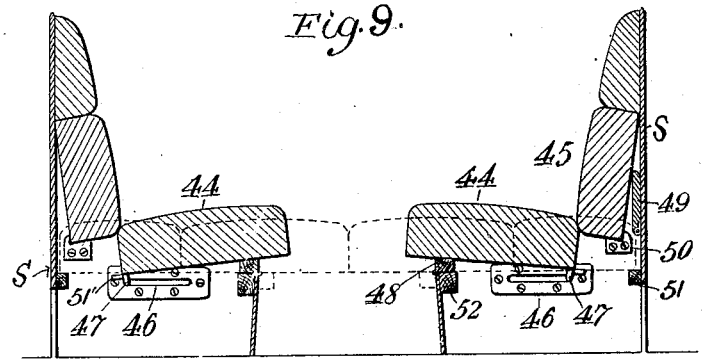
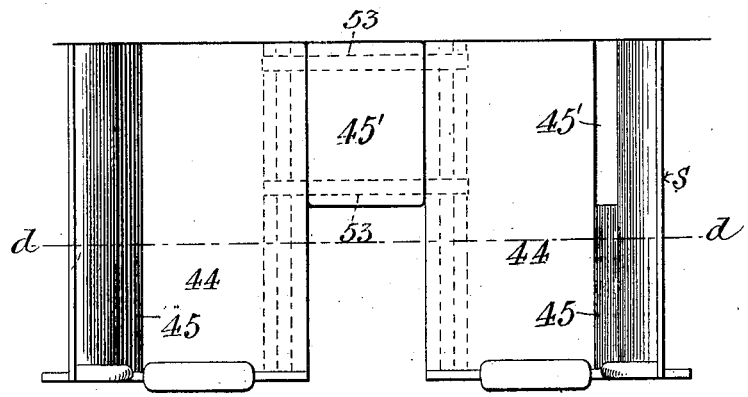
WITNESSES:
Edwin L. Bradford
Wm. G. Steinmetz Jr.
INVENTOR
F. E. Stebbins No. 897,315.

PATENTED SEPT. 1, 1908.

F. E. STEBBINS.
CAR CONSTRUCTION.
APPLICATION FILED DEC. 24, 1897.

10 SHEETS—SHEET 7.

Witnesses
Edward Bradford

Inventor
F. E. Stebbins

No. 897,315. PATENTED SEPT. 1, 1908.
F. E. STEBBINS.
CAR CONSTRUCTION.
APPLICATION FILED DEC. 24, 1897.
10 SHEETS—SHEET 8.

Witnesses:
Edwin L. Bradford
Wm. G. Steinmetz Jr.

Inventor
F. E. Stebbins

No. 897,315. PATENTED SEPT. 1, 1908.
F. E. STEBBINS.
CAR CONSTRUCTION.
APPLICATION FILED DEC. 24, 1897.

10 SHEETS—SHEET 10.

WITNESSES:

INVENTOR

UNITED STATES PATENT OFFICE.

FRANK E. STEBBINS, OF WASHINGTON, DISTRICT OF COLUMBIA.

CAR CONSTRUCTION.

No. 897,315.      Specification of Letters Patent.      Patented Sept. 1, 1908.

Application filed December 24, 1897. Serial No. 663,352.

*To all whom it may concern:*

Be it known that I, FRANK E. STEBBINS, a citizen of the United States, residing at Washington, District of Columbia, have invented certain new and useful Improvements in Car Construction, of which the following is a sufficiently full, clear, and exact description as will enable others skilled in the art to which they appertain to make and use the same, reference being had to the accompanying drawings, and to the letters and figures of reference marked thereon, which form a part of this specification.

The improvements relate generally to car construction and specifically to the interior formation and arrangement of single or twin cars to the end of adapting the same for sleeping purposes by night as well as for convenient use by day.

The object of the invention is the production of a sleeping car which shall be very open and wide at the top and in which the berths do not project from the wall inwardly to an objectionable degree; which shall have high windows; which shall not be weighted and hampered by cumbrous upper berths; which shall have the bedding and other paraphernalia stored at the floor during the day; which shall be provided with alcoves adjacent the berths for the use of passengers while undressing and dressing; which shall have toilet appliances adjacent the berths; which shall be provided with receptacles for hand baggage by day; which shall have abundant air space and good ventilation; which when desired shall have upper berths yieldingly or spring supported to prevent the transmission thereto of vibrations; which shall have seats adapted to form a sofa occupying one-half the area of the space between the seat backs; and which shall be more elegant, artistic, commodious, and convenient than any sleeping car now in use or heretofore designed.

The invention consists in certain novelties of construction and combinations and arrangements of parts as hereinafter set forth and claimed.

The accompanying drawings illustrate by way of example what may be considered the best modes so far devised for the physical embodiment of the invention and the practical application of the principles.

Figure 5:
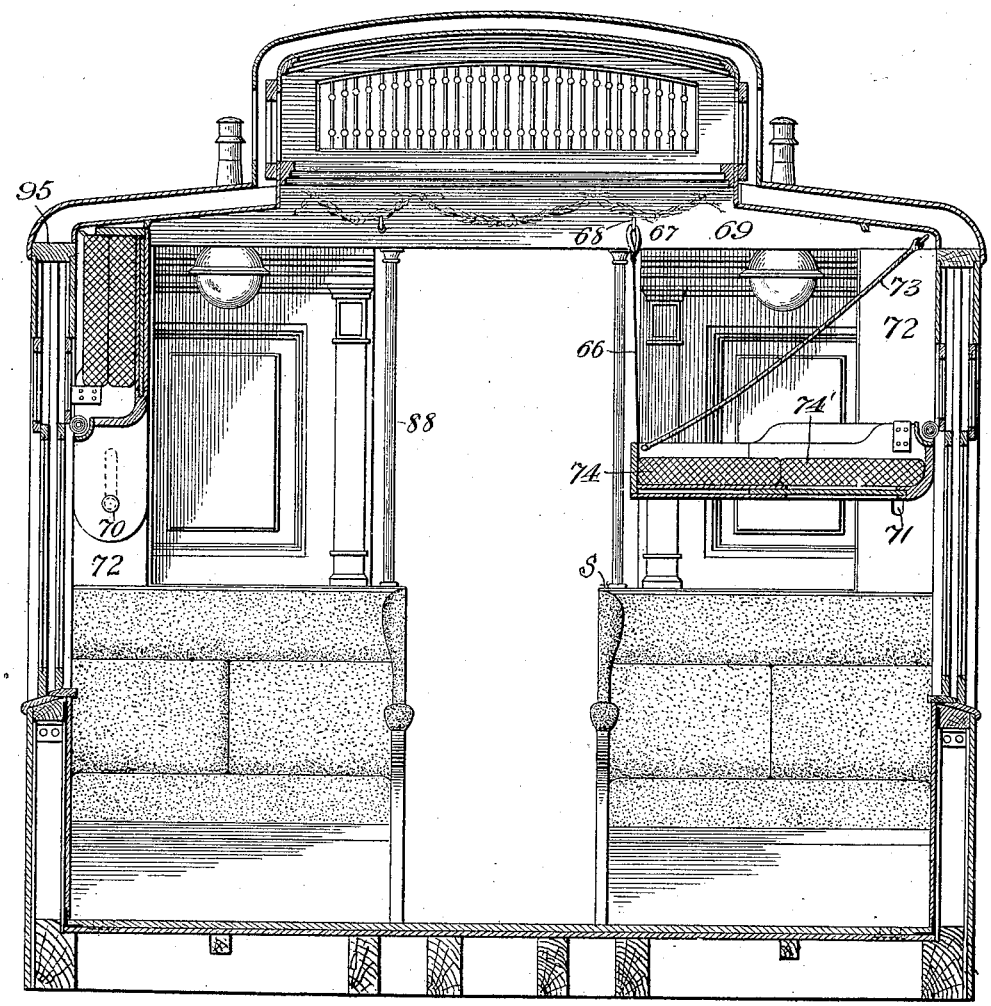
Figure 12:
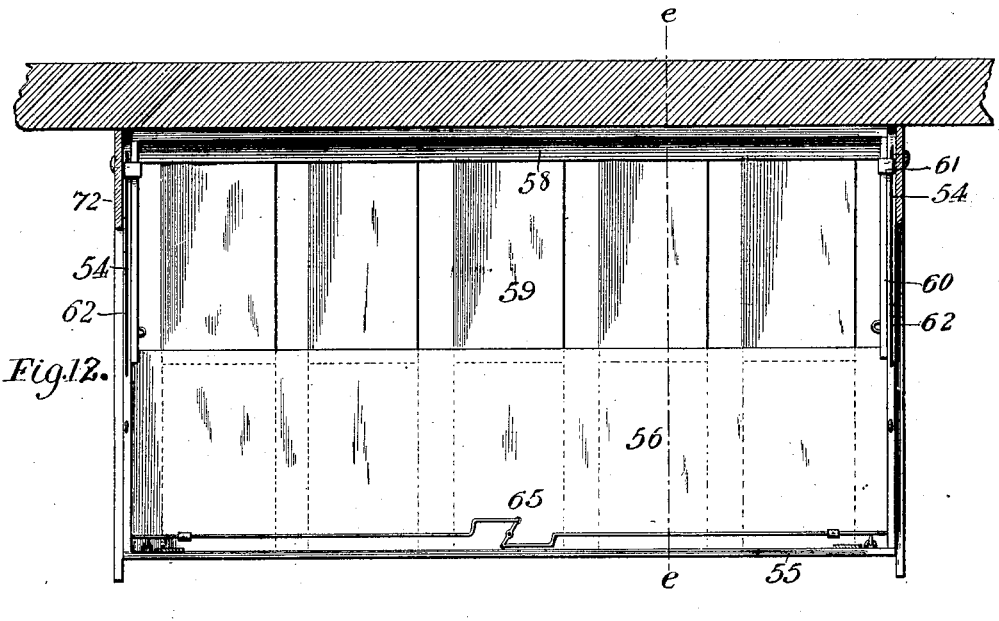
Figure 11:
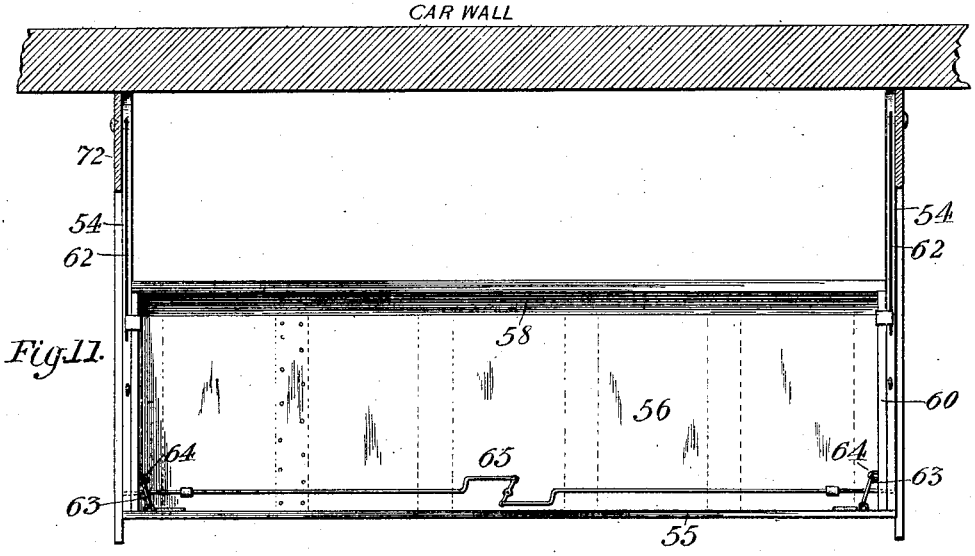
Figure 10:
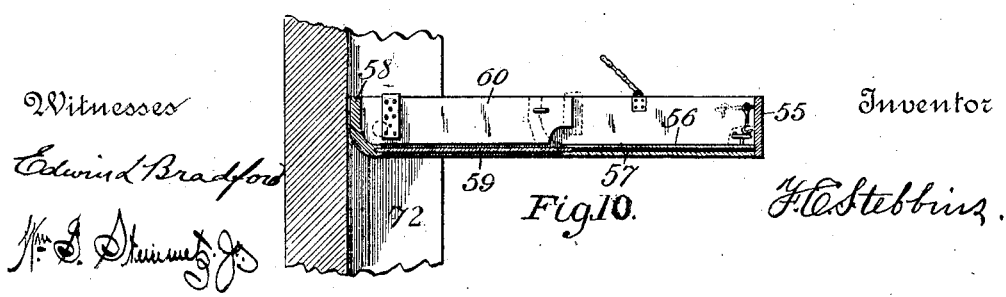
Figure 13:
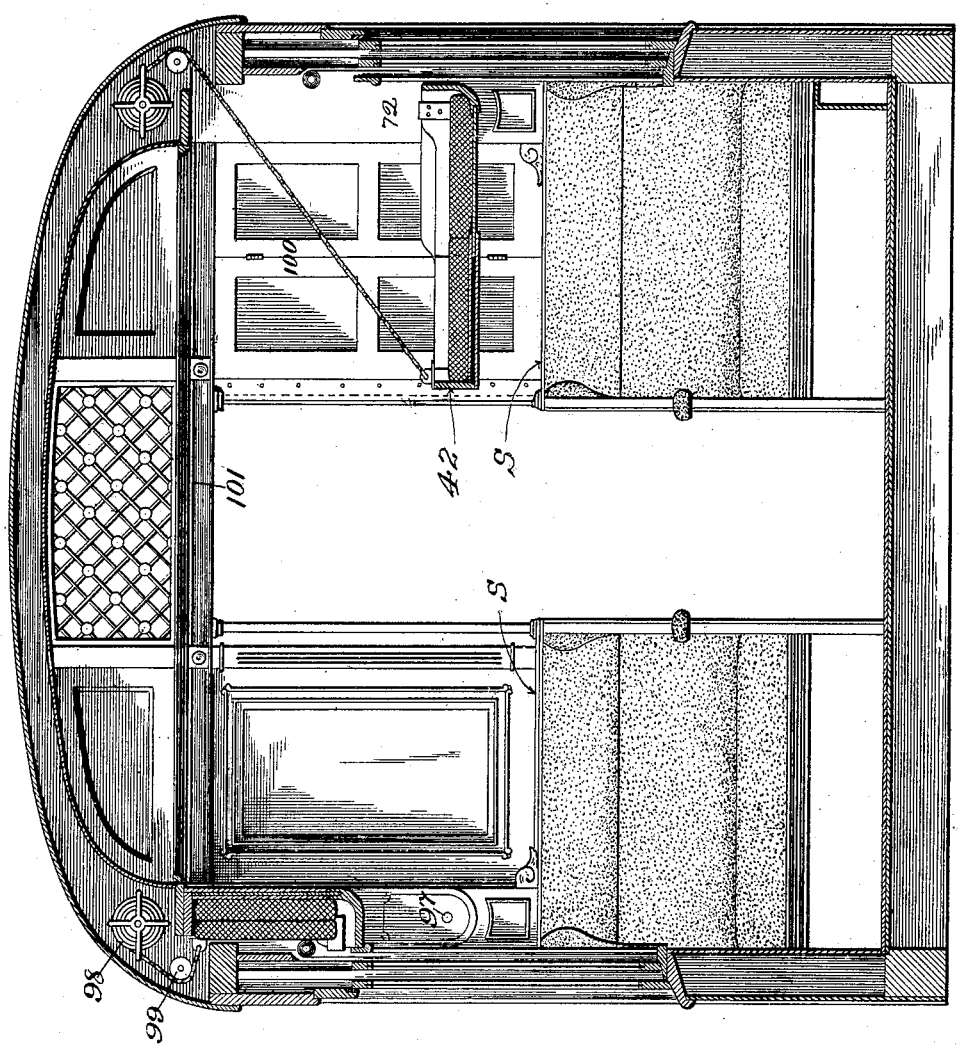
Figure 14:
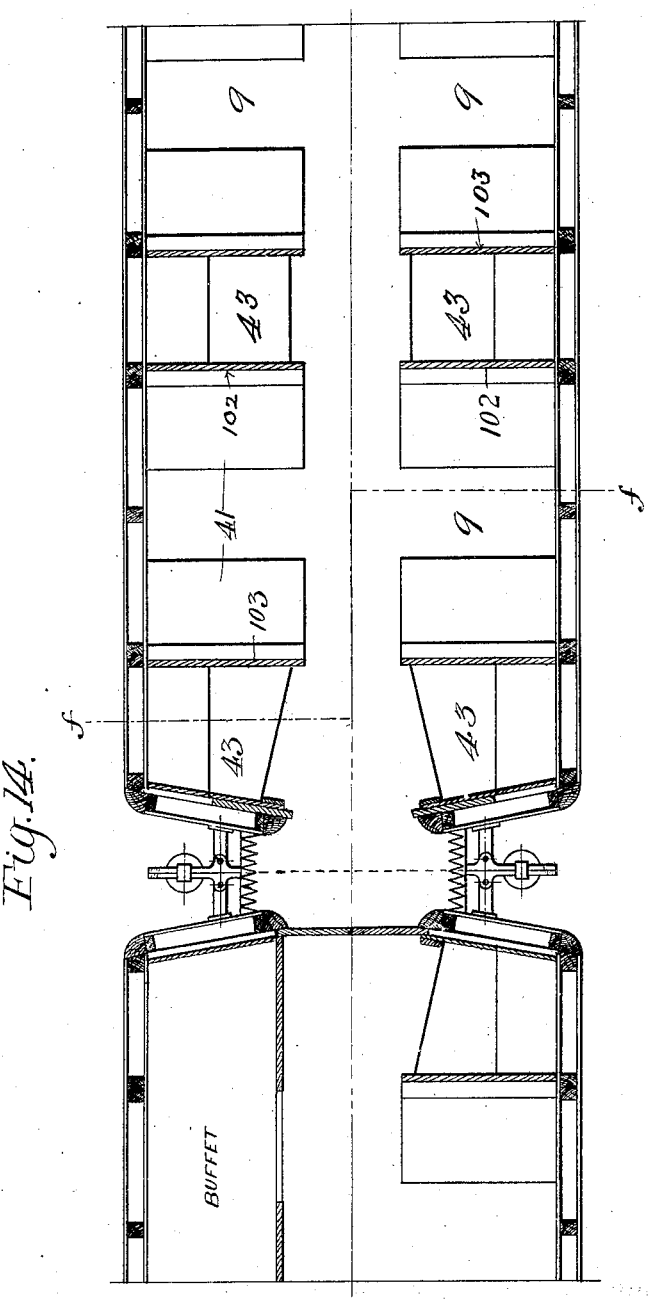
Figure 15:
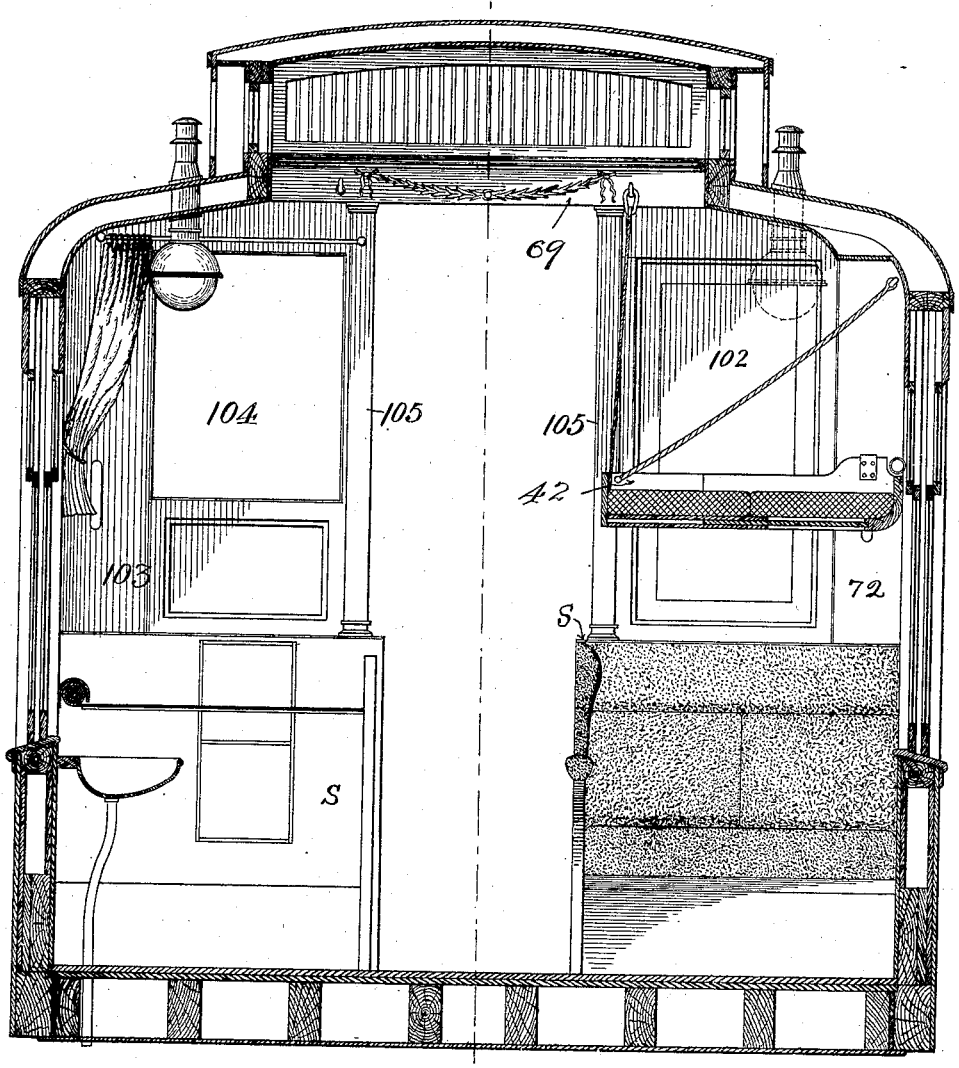

Figure 1 is a plan view of a twin car, the horizontal section being taken above the seat backs with the windows omitted. The end A is attached to the end B and the interior arranged as a convertible alcove sleeping and day car. Fig. 2 is a portion of the floor plan of an alcove sleeping car, the section being taken above the seat backs and the windows not being shown. Fig. 3 is a longitudinal sectional view in elevation taken through the central passage in Fig. 2. Fig. 4 is an enlarged view of a portion of Fig. 3 showing an upper berth lowered and an upper berth closed. Fig. 5 is a cross section on line $b$—$b$ of Fig. 2 looking towards the right and showing one upper berth lowered and another raised. Fig. 6 is a cross section on line $c$—$c$ of Fig. 4 looking towards the right and showing the removable head board in place upon a seat back. Fig. 7 is a sectional view like Fig. 6 looking towards the left and showing the narrow head board in place upon a seat back. Fig. 8 is a plan view of two seats facing each other parts thereof being arranged to form a sofa by day. Fig. 9 is a section on line $d$—$d$ of Fig. 8 showing by dotted lines how the seat cushions and back upholsterings are arranged to form a lower berth by night. Figs. 10, 11, and 12 are detail views of an upper berth, Fig. 10 being a section on line $e$—$e$ of Fig. 12. Fig. 13 is a cross section of an alcove sleeping car having a Norman or arched roof. Fig. 14 is a plan view of ends A and B of Fig. 1 with the platforms omitted and the ends joined, the fixed partitions between the sleeping sections and alcoves, which partitions extend to or adjacent the roof of the car, being shown in cross section. Fig. 15 is a cross section of an alcove sleeping car adapted to form a state room car, the section being taken on line $f$—$f$ of Fig. 14 through an alcove and a sleeping section.

The letters A and B in Fig. 1 designate ends of car bodies which are to be united so as to form a twin sleeping car; 1, 1, are buffer plates; 2, 2, the platforms which are on the same level as the floors of the cars; 3 and 4 are the extreme ends of the twin car, and the ends are designed respectively for the use of women and men; the end 3 being arranged to form boudoirs, as shown, and wash rooms and closets; and the end 4 being constructed to form a smoking room and water closets. A buffet is preferably located adjacent the jointed ends of the cars thus making it about equally distant from the remote ends of each. In Fig. 14 the ends A and B are shown in juxtaposition with the platforms omitted.

In Fig. 1 the partitions 106 adjacent the closets and boudoir end of the car, and the partition 107 adjacent the buffet are fixed and extend from the floor to the arch rails or roof. The car end walls 108 each bound one side of an alcove space and to perform this function they are equivalent to partitions. There may be head boards or partitions in connection with the seat backs, indicated by 109, at the ends of the cars, like that shown at the left in Fig. 15, or like that at the right in the same figure. When like the former, they each have an opening above the seat back to afford access to the upper berth from the alcove space.

The following method of constructing and arranging the interior of either single or twin cars, so as to adapt them for sleeping purposes and convenient use by day, I regard as preferable, to wit: Pairs of seats are disposed along each side of the body of the car with the ends against the walls, the opposite ends of the seats being separated a sufficient distance to form an open central passage way or aisle. Adjacent each and every pair or between two pairs, or every other pair is left a space bounded by the car wall, the roof, the floor and two seat backs, or a seat back and a partition, to form an alcove. The seats may be transformed into a lower bed or a sofa by adjusting the seat cushions and upholstering of the back or backs.

In the alcove is placed a wash basin which is supplied with hot and cold water by pipes leading from reservoirs under the car. The alcove is shut off from the aisle, for example, by a movable partition or door hung on double hinges, see Fig. 2, and located several inches inwardly from the seat ends. About 10" or 15" below the top of the seat back is provided a movable cover to inclose the space beneath. This inclosed space is designed to receive the mattresses, bedding, &c. during the day. The capacity of the inclosed part is increased by cutting away the bottom of the seat back boards, so that the mattresses may be extended to the right and left under the seats proper. The space above the cover and between the seat backs forms a receptacle for hand baggage by day. By providing an alcove with toilet appliances the passenger may occupy the berth in the morning as long as desired and is not compelled to traverse the length of the car in dishabille to reach the wash room at the end of the car. Commodious space for undressing at night and dressing in the morning is also secured. In thus making an alcove adapted to receive the bedding during the day it is possible to introduce an improved and very desirable construction in the top of the car, and an improved form of upper berth which will occupy but little space when closed up against the wall and which will not project outwardly into the body of the car appreciably or downwardly to limit the window height and area.

I am aware that attempts have been made to construct an upper berth which would not project outwardly into the car, but all such have been failures and none of them successfully have been put in use. The failures have been due not only to an ignorance of the problem to be solved but also of the way in which to solve it. The width and height of a car is limited in practice by the size of tunnels, bridges, and obstructions along the permanent way, and by the gage of the track. The height practically is restricted in passenger cars to about 7', or at the most 7' 4", from the floor to the top of the plates, or to the spring of the arch above the plate, the standard height being about 6' 10½" or less over the plate. In sleeping cars this height should be less than 7' 4" or at least not above that height by reason of the necessary increase of weight in the top which causes the car to roll when in motion. The practical limits of heights are between 6' 6" and 7' 4" from the top of the floor to the top of the plate. Attempts have also been made to store the bedding under the floor, but for well known reasons all of them have been complete failures.

In constructing an upper berth I propose to observe approximately the following dimensions: distance from floor to window sill 2' 5", from window sill to top of window 2' 8" or 3', perpendicular height of upper berth when closed from the top of the window 1' 7" to 2' 3". On the seat backs or above and in line therewith are fixed permanent division boards or bulkheads extending to the arch rails or roof and with the seat back partitions or boards bounding the alcoves. To these boards and at a distance of about 3' above the lower berth when arranged is pivoted the upper berth. The width of this berth may be from 3' to 3' 6" approximately when in use, 39" is a desirable width. The upper berth is arranged so it can be contracted or collapsed or folded and be of less width when so contracted than when open. A torsion braided wire or other mattress which folds may be attached to the berth. When lowered and in use this berth is in a position approximately 3' above the lower berth and below or a part thereof below the tops of the windows. When not in use it is located in a vertical or perpendicular or nearly perpendicular position above the windows and parallel with the car wall, and does not obstruct the top of the car appreciably. The arch of the roof matches and is a continuation of the paneling of this upper berth when the same is closed.

An important feature of the upper berth construction is that it shall be adapted to change its form so as to be in such a shape that the main portion thereof may occupy the space above the windows by day, and that it can be made to occupy a lower position by night, preferably below the top of the windows when high windows are used. Many forms of berths can be constructed which will embody this idea after an inspection of my own. The form which I think suited to the requirements consists of two parts, one movable relative to the other. The fixed part is comprised of two arms joined for a portion of their length from the outer ends by horizontal and perpendicular boards of veneer so as to form a box for the mattress when folded. The movable part folds onto, or telescopes into the fixed part in any suitable way. The inner ends of the arms are pivoted to the boards or bulkheads which rest on the seat backs, or to the wall of the car, or they may be provided with journals movable in slots in the bulkheads as hereinafter described. This type of berth is easily manipulated, occupies but little space when folded up against the wall which can be effected by the aid of fusees and chains, or in any other way, and is exceedingly light in weight. In the partially open type of car the head boards for separating the berths by night are preferably made so they can be folded up and conveniently stored in the alcoves. In stateroom cars the partitions or head boards are permanently fixed in position, as shown for example in Figs. 14, and 15. The roof may be in the form of a clear story, or a Norman arch form may be selected when so desired.

In the common type of sleeping car now in use, having a central aisle with pairs of seats and upper berths on each side thereof, the passengers must undress and dress behind the berth curtains, and enter the lower and upper berths from the aisle. As shown by two examples of the embodiment of my improvements, Figs. 1 to 7 and 14 to 15 respectively, not only are alcoves provided within which the passengers may dress, undress, and wash, but also each lower berth is isolated from an alcove space and access to the upper berth made possible from the alcove. In Figs. 1 to 7 the alcove is bounded by two seat backs and bulkheads; the car wall, roof and floor; and two movable partitions or headboards upon the seat backs, (or when the alcove is at the end of a car by a permanent partition and a movable partition). One of the movable partitions or headboards (see Fig. 6) shuts off the alcove from an adjacent section, while the other and smaller movable partition (see Fig. 7) at the opposite side of the alcove closes the opening between the seat back and the edge of the upper berth when lowered, isolating the lower berth from the alcove but leaving an opening for access to the upper berth at the end thereof and from the alcove. In the example shown by Figs. 14, 15, where the alcove is bounded at the sides by fixed partitions or seat backs and partitions, one of the said partitions is provided with an opening above the end of an upper berth when lowered so that access to the said upper berth is possible from the alcove. In each example a guard is provided for shutting off the upper berth from the aisle and to prevent the occupant of the berth from being thrown out. Whether the movable or fixed partitions are employed the end of isolating each berth from every other is attained, and at the same time access to each upper berth at the end thereof and from the alcove is made possible.

Several embodiments of my improvements are illustrated by the drawings. In Figs. 1, 2, and 14 part of the floor area is divided into sections 9. Each section is provided with two seats 41 facing each other and an upper berth 42. An alcove 43 is located adjacent a seat back. The frame of a seat comprises as main elements vertically disposed partitions or back boards S, each at right angles to the wall of the car and with one edge abutting the said wall, an end portion T at right angles to the back board and supporting an arm rest, a front rail 52, a division board 52', a bar 48 hinged to rail 52, and a support 51 secured to the back partition. The seats are provided with movable upholstered cushions 44, removable back upholsterings 45, 45'—the latter piece being half the length of the piece 44—slotted plates 46 one on the wall and another similarly disposed upon the inside surface of a seat end, journals 47 secured to the cushion frame at each end thereof and the ends traveling in the slots of the plates 46, supports 50 for the back upholstering, and ledges 51' secured to and projecting from the rear edge of the cushion frame.

Referring to Figs. 8 and 9, when it is desired to transform half of the area between the seat backs into a sofa or lounge, the hinged pieces 48 are turned to the positions shown in dotted lines allowing the cushions to drop and rest on the rails 52; the two bars 53 are placed under the cushions and upon the rails as shown in dotted lines; next the piece 45' is removed and placed upon the bars; and finally the folding leaf 49 is turned down. The hinged pieces 48 normally perform the exceedingly desirable function of raising the outer edges of the cushions and thus aid in constituting a comfortable seat. The seat backs are so fashioned that the head rests will support the head, and the upholstering below will engage and press against the lumbar region of the back of the passenger. To transform the upholsterings and cushions into a lower berth the pieces 48 are lowered, the cushions pulled out to the positions shown in dotted lines Fig. 9, and then the upholsterings 45 45' are dropped to horizontal positions on the supports 51, 51' as is also shown in dotted lines. It will be observed that no supports for the front edges of the cushions are needed in addition to the journals 47 and the rails 52.

The upper berth 42 is comprised of two arms 54, an end piece 55, a bottom piece 56 provided with recesses 57; a movable portion consisting of the curved piece 58 sliding pieces 59 and end pieces 60; guides 61 secured to pieces 60, and seated and traveling in slots 62 formed in the top edges of arms 54; hooks 63 engaging eyes 64; fastening means 65 of the well known type; flexible guards 66 of the form or construction shown in Fig. 4; rubber rings 67 about 1" in diameter for engaging hooks 68 fixed to the arch rails 69; journals 70 secured to the arms 54 and movable in slots 71 made in the bulkheads 72; a supporting strap or cord 73; and a torsion braided wire or other mattress preferably made in two parts 74 74' united, the former being secured to the bottom piece 56. On the bulkheads and within the alcoves are hooks 75 from which are yieldingly supported the rear edge of the upper berth through the medium of rubber rings 76 which pass around the ends of the journals 70 and over the hooks. The rubber rings 76 are identical with the rings 67 which support the front edge of the upper berth.

Assuming the upper berth to be closed as shown at the right in Fig. 4, and at the left in Fig. 5 and it is desired to move the same into proper position to receive the bedding, the following manipulations are necessary: The handle 65 of the locking device is turned and the berth swung through an arc of 90 degrees where it is supported in a horizontal position by the strap or cord 73; the movable portion comprising parts 58, 59 and 60 is next drawn or telescoped out from the position it occupies in Fig. 11 to its position in Fig. 12; then the part 74' of the mattress is turned over upon the movable portion of the berth, as shown at the right in Fig. 5. After the bedding has been arranged—the supplemental mattress being taken from the alcove and adjusted in position—the guard 66 is placed in position, the rubber rings being passed over the hooks 68 and the front of the berth thereby elevated several inches; then the rear edge of the berth is raised and supported by the rubber rings 76, the journals 70 occupying positions above the bottoms of the slots, as shown. When thus arranged the berth is spring supported and its motion, when the car is running, will be of a gentle pendulous nature and the tremulous and rapidly succeeding vibrations of the car body will not be transmitted to it.

By making the journals or pivotal points of the upper berth movable in connection with this type of berth, the distance from the floor over the plate or to the spring of the arch may be kept at the normal standard or even lower, inasmuch as the process of closing the berth against the car wall at the same time drops it bodily, and yet when so dropped it does not objectionably limit the height of the windows.

The alcove 43 is a space between two permanent seat backs or between a seat back and a panel or partition, shut off from the central passage by the door 77 preferably hinged and folding, as shown by dotted lines in Fig. 2, and placed several inches inwardly from the passage way; 78 is a flexible blind on a roll 79 which is supported when drawn out on strips 80 secured to the back partitions or boards S S. The blind is 10" to 15" below the tops of the seat backs and serves as a resting place for hand baggage by day. A wash basin 81 is fixed against the car wall at the rear of the alcove and supplied with hot and cold water through the pipes 82 and 83. In the wall of the car is a closet 84 for the reception of towels, soap &c., closed by a door 85 provided with a mirror, as shown. The seat partitions or back boards are cut-away at 86 for the purpose of forming openings to the space under the seats and thus increasing the capacity of the alcove. 87 are hinged folding head boards each resting upon a seat back partition or board and with its inner vertical edge abutting the edge of the bulkhead 72; 88, posts extending from the seat backs to the arch rails; 89, metal strips on the head boards which engage the posts; 90, a sliding bolt; 91, a narrow head board shutting off the lower berth from the alcove; 92, metal strips to engage the post; and 93 is a removable step supported by headed bolts in slots 94 made in the seat backs. It will be observed that access to the upper berth is at the end thereof, and that the guard prevents the occupant from being thrown out. I have shown the arch rails 69 located so that their lower edges are about the height of the plates 95, but as illustrated in modifications hereinafter described especially of the stateroom car Fig. 15, I prefer to locate them between the clear story sills, and the rod 96 which supports in part the large berth curtain will then be in a higher but not inaccessible position. When the lower edges of the arch rails are on a line with the clear story sills it may be considered desirable to omit the posts 88 entirely, or to substitute for them posts of wood and metal.

Referring to Figs. 2, 3, and 4, it will be noted that the attempt has been made to give the seats the appearance of inclining rearwardly, and in so doing the end pieces T have been extended beyond the back boards, and some distance at the top in front of the alcove. This construction from an artistic standpoint is very effective while at the same time it does not obstruct the passage to the alcove.

The modifications of the roof, interior arrangements, and upper berths are as follows: Fig. 13 is a cross section of a car having a Norman or arched roof and fitted up for sleeping purposes. The number 97 designates the pivots of the berth arms; 98, fusees and chains; 99, guide wheels; 100, a removable head board substantially like that one shown in Fig. 6; and 101 the arch rails. The section is taken through the upper berths, one of which is shown lowered and extended and the other contracted and raised. The remaining interior fittings and arrangements are essentially like those described in connection with the first example. It should be observed that the pivots 97 for the upper berth arms are fixed in the bulkheads and are not movable, also that the fusee and chain are located behind the paneling which is a continuation of the paneling of the upper berth when closed, the lower end of the chain being secured to the outer edge of the berth and extended upwardly, as shown, which location of the chain in this example is permissible inasmuch as the head boards entirely shut off the alcoves from the sections and access to the upper berths is from the central passage way.

Fig. 14 is a plan view and Fig. 15 a cross section of a stateroom sleeping car fitted with alcoves and upper berths. Fig. 15 is a section taken on line $f$—$f$ of Fig. 14 and looking towards the right. The part at the left is a section through an alcove, and the part at the right a section through an upper berth when lowered, and the space between two seats. In this type of car the head boards are permanent and that one adjacent the accompanying alcove of a section is cut away to afford access to the upper berth at the end. The number 102 designates a permanent head board or partition extending from the seat back to the arch rail which latter is on a line with the clear story sills; 103, a permanent head board or partition cut away at 104 to form a passageway from the alcove to the upper berth when lowered; and 105 are posts extending from the seat backs to the arch rails.

Heretofore it has been the practice to construct stateroom cars with a series of closed rooms along one side of the car with a passage adjacent the other side of the car. Such an arrangement is objectionable by reason of the limited number of rooms that can be formed in a car, the obstruction of the view from one side, and the excessive isolation of the passengers.

A stateroom car constructed as I have described secures the desirable seclusion without too much isolation, and is adapted for the use of the general traveling public as well as for families and small parties.

On reference to the several examples of the interior and berth arrangements it will be seen that when the upper berth is telescoped or contracted and moved to a vertical position, its lower edge is adjacent the top of the windows or above the same, and that when lowered it is in a horizontal plane below the top of the windows. But my type of contracting berth may be used in connection with relatively low windows when so desired.

By comparing the improved interior formations, constructions and arrangements herein set forth with the most advanced type of sleeping car now in use it becomes obvious that many of the objectionable features of the latter have been eliminated in the construction of the former. Some of the objectionable features of the latter type now in use are: The top of the car is obstructed by the inwardly projecting and ponderous upper berths giving an oppressive effect to the entire interior; the windows are limited in height to about 26" by reason of the downwardly extending inner edges of the upper berths; the great weight of the upper berths and bedding raises the center of gravity of the car and causes it to roll from side to side; the bedding is stored away under the roof where it becomes heated in the summer; the wash rooms are at the ends of the car to which the passengers must repair in dishabille; no suitable place for undressing at night or dressing in the morning is afforded; the air space is insufficient; receptacles for hand baggage, bundles, &c., by day are not provided; and the interior shape and proportions are inelegant and unartistic even when finished in the richest woods and ornamented with intricate carvings and costly trimmings. The problem of designing a car from which these objectionable features should be eliminated is believed to have been solved by the introduction of the improvements hereinbefore set forth.

Attention is called to the fact that the particular physical embodiments of the improvements herein set forth illustrate modes and examples only of the practical application of the principles. The improvements may be applied in other modes which will fall within the conceptions. Formal and colorable changes may likewise be introduced and an equivalent element or elements substituted for any one or all of those shown or described and the resultant construction still embrace the substance of the invention.

What I claim as new and desire to secure by Letters Patent is:

1. The combination with a car, of two seats facing each other and each provided with a single integral movable cushion, and back upholstering; one of said back upholsterings being divided and a part thereof removable and adapted to fit the space between the cushions; and means for supporting said removable part in position, whereby a part of the area between the backs may be transformed into a lounge by day.

2. The combination with a car, of two seats facing each other, seat cushions provided with journals traveling in slots, seat rails, the said cushions being adapted to be drawn out and supported on the rails, and in connection with the removable back upholsterings forming a lower berth; and removable back upholsterings adapted to fit the spaces between the rear edges of the cushions when drawn out and the back boards.

3. The combination in a sleeping car, of two seats facing each other and having removable cushions; means for raising the outer edges of the cushions; and means connecting the rear edges of the cushions with the seat frames which will allow the cushions to be drawn out and which will support the same and prevent the front edges from dropping when so drawn out.

4. The combination in a sleeping car, of two seats facing each other and having movable cushions; movable means for raising the outer edges of the cushions; back upholsterings one of which is made in two parts; and means for supporting part of the back upholstering between the two cushions, when the means for raising the outer edges have been removed, whereby a sofa is formed for day use.

5. The combination in a car, of two seats facing each other; movable cushions; movable back upholsterings, one of which is made in two parts; pieces hinged to the seat rails for raising the outer edges of the cushions; and means for supporting a part of a back upholstering between the edges of the cushions when said edges are lowered.

6. The combination in a car, of two seats facing each other; two integral cushions; an integral back upholstering for one seat; and a back upholstering made in two pieces for the other seat; all for the purpose specified.

7. The combination in a car of two seats facing each other; back upholsterings, one of which is made in two parts; and a leaf hinged to the seat back and adapted to be turned to a horizontal position; whereby when a part of the back upholstering is removed and supported between the edges of the cushions the said leaf will complete the sofa, or lounge, formed for day use.

8. The combination in a car, of two seats facing each other; seat cushions; and removable back upholsterings; each of said cushions being provided with a ledge or projection at its rear edge for supporting the back upholstering at its front edge when the cushions and back upholsterings are arranged to form a lower berth.

9. An upper berth for a sleeping car having arms pivoted at their inner ends to the car, a fixed outer panel joining the front ends of the arms, and a rear part movable relative to the panel and adapted to constitute with the outer panel the foundation for an upper bed.

10. An upper berth for a sleeping car having arms pivoted to the wall or bulk heads, a fixed outer panel and an edge piece forming a receptacle, and a movable part adapted to be supported between the arms and panel and constitute with the panel a berth foundation.

11. An upper berth for a sleeping car having arms pivoted to supports at the car wall, a fixed outer part joining the said arms, and a rear portion or part movable relative to the arms and the fixed outer part.

12. A collapsible upper berth for sleeping cars said berth being pivoted near its ends to or adjacent the car wall and having a part thereof adjacent the wall movable relative to the remaining part of the berth, whereby the same can be narrowed to occupy a position above the windows.

13. An upper berth for a car having journals movable in slots made in the bulk heads, and means for yieldingly supporting the journals.

14. An upper berth for a car having journals at its rear edge, bulk heads with slots for the journals, and springs for supporting the journals and the outer edge of the berth.

15. An upper berth for a car having journals, bulk heads with slots for the journals, and rubber rings for supporting the journals in the slots.

16. An upper berth for a car having two arms with movable pivotal supports, an outer part joining the arms, a rear movable part, and means for supporting the ends of the arms, when the berth is in a horizontal position, in a plane higher than the positions they occupy when the berth is folded against the car wall.

17. An upper berth for a car having arms pivoted to the car below the tops of the windows, an outer panel or piece uniting the arms, and a rear part movable relative to the outer piece or panel, whereby the main portion of the berth when raised will be above the windows, and when lowered will lie adjacent or below the tops of the windows.

18. A collapsible upper berth having arms pivoted to the car wall or bulk heads, a fixed outer panel or piece, a rear movable part, and a mattress part of which may be folded over upon the panel and moved with it to a vertical position against the car wall.

19. A berth for a car having arms pivoted to the bulk-heads; a front outer panel or piece uniting the arms; and a rear movable portion comprising a piece curved in cross section and strips or pieces 59 attached thereunto, in substance as set forth.

20. A berth for a car comprising arms, a panel with recesses uniting the arms, and a movable part telescoping within the recesses of the panel.

21. An upper berth for a sleeping car comprising arms pivoted to the car wall or bulkheads, a fixed outer part or panel; a rear or inner movable part; and a mattress, part of which is adapted to be folded upon itself; said outer part and mattress being adapted to occupy a vertical position above the windows when the berth is closed.

22. The combination in a sleeping car and with the wall, of an upper berth comprising two rigid arms pivoted to or adjacent the wall, a rigid bar uniting the outer ends of said arms, and a bed foundation the rear part of which can be contracted or shifted from its extended position towards the said bar and turn with said arms and bar to a substantially vertical position adjacent the car wall.

23. The combination in a sleeping car and with the wall, of an upper berth comprising two rigid arms pivoted to or adjacent the wall, a rigid bar uniting the outer ends of said arms, a bed foundation the rear part of which can be contracted or shifted from its extended position towards the said bar and turn with said arms and bar to a substantially vertical position adjacent the car wall, and means for covering and concealing the said contracted bed foundation when so turned to a vertical position.

24. The combination in a sleeping car and with the wall, of an upper berth comprising two arms pivoted to or adjacent the wall, a panel uniting the outer ends of said arms, and a bed foundation the rear part of which can be moved from its extended position towards the panel and turned with said arms and panel to a substantially vertical position adjacent the wall.

25. The combination in a sleeping car and with the wall having a window or windows, of an upper berth comprising two arms pivoted to or adjacent the wall, a rigid bar or piece uniting the outer ends of the arms, and a contracting bed foundation supported at its front edge by or adjacent said bar and with its rear edge when extended adjacent the top of the window or tops of the windows, said bed foundation being adapted to contract and turn with the said arms and bar to a substantially vertical position adjacent the wall and above the said window or windows.

26. The combination in a sleeping car and with the wall having a window or windows, of an upper berth comprising two arms pivoted to or adjacent the wall, a rigid bar or piece uniting the outer ends of the arms, a contracting bed bottom supported at its front edge by or adjacent said bar and with its rear edge when extended adjacent the top of the window or tops of the windows, said bed bottom being adapted to contract or fold and turn with the said arms and bar to a substantially vertical position adjacent the wall and above the said window or windows, and means for covering the bed bottom when in its vertical position.

27. The combination in a sleeping car and with the wall and bulk-heads, of an upper berth comprising two rigid arms pivoted to the wall or bulk-heads, a rigid bar or piece uniting the outer ends of the arms, and a bed foundation which can contract and turn with said arms to a substantially vertical position adjacent the wall and between the bulk-heads.

28. The combination in a sleeping car and with the wall and bulk-heads, of an upper berth comprising two arms pivoted to the wall or bulk-heads, a rigid bar or piece uniting the outer ends of the arms, a bed foundation which can contract and turn with said arms to a substantially vertical position adjacent the wall and between the bulk-heads, and means for covering the bed bottom in its vertical position.

29. The combination in a sleeping car and with the floor and walls, of fixed rigid seat backs or partitions located adjacent the walls and substantially at right angles thereto dividing the floor area into a central passage way, sections, and alcove spaces adjacent the walls; means for forming a lower berth in each section; means for forming a horizontal upper berth in each section and entirely therein; and partitions or head boards in connection with the seat backs or partitions; the lower berths being shut off from the alcove spaces by the fixed seat backs or partitions; and said alcove spaces being open to the central passage way and free and unobstructed above their floors affording suitable secluded standing room for the passengers while undressing and dressing.

30. The combination in a sleeping car and with the floor and wall, of fixed rigid seat backs or partitions located adjacent the wall and substantially at right angles thereto dividing the floor area into sections, and alcove spaces adjacent the wall; means for forming a lower berth in each section; means for forming a horizontal upper berth in each section and entirely therein; wash basins at the wall in the alcove spaces; and partitions or head boards in connection with the seat backs; the lower berths being shut off from the alcove spaces by the fixed seat backs; and said alcove spaces being open at their fronts and free and unobstructed above their floors affording suitable secluded standing room for the passengers while undressing, washing and dressing.

31. The combination in a sleeping car and with the floor and wall, of fixed rigid seat backs or partitions located adjacent the wall and substantially at right angles thereto dividing the floor area into sections, and alcove spaces adjacent the wall; means for forming a lower berth in each section; means for forming a horizontal upper berth in each section and entirely therein; movable means for inclosing part of each alcove space to form a receptacle; and partitions or head boards in connection with the seat backs; the lower berths being shut off from the alcove spaces by the seat backs; and said alcove spaces being open at their fronts and free and unobstructed above their floors affording suitable secluded standing room for the passengers while undressing and dressing when the means for inclosing the alcove spaces are moved.

32. The combination in a sleeping car and with the floor and walls, of fixed rigid seat backs or partitions located adjacent the walls and substantially at right angles thereto dividing the floor area into a central passage way, sections, and alcove spaces adjacent the walls; means for forming a lower berth in each section; means for forming a horizontal upper berth in each section and entirely therein; and movable partitions or head boards in connection with the seat backs; the lower berths being shut off from the alcove spaces by the fixed seat backs; and said alcove spaces being open to the central passage way and free and unobstructed above their floors affording suitable secluded standing room for the passengers while undressing and dressing.

33. The combination in a sleeping car and with the floor and walls, of fixed rigid seat backs or partitions located adjacent the walls and substantially at right angles thereto dividing the floor area into a central passage way, sections, and alcove spaces adjacent the walls; means for forming a lower berth in each section; means for forming a horizontal upper berth in each section and entirely therein; wash basins at the wall in the alcove spaces; and movable partitions or head boards in connection with the seat backs; the lower berths being shut off from the alcoves by the fixed seat backs; and said alcove spaces being open to the central passage way and free and unobstructed above their floors affording suitable secluded standing room for the passengers while undressing, washing and dressing.

34. The combination in a sleeping car and with the floor and wall, of fixed rigid partitions or seat backs located adjacent the wall and substantially at right angles thereto dividing the floor area into a section and an alcove space adjacent the wall; means for forming a lower berth entirely within the section; means for forming an upper horizontal berth located entirely within the section and above the lower berth; and rigid partitions or head boards in connection with the partitions or seat backs which bound the section and alcove space; the lower berth being shut off from the alcove space by the fixed partition or seat back, and said alcove space being open at its front to the front of the section and affording suitable secluded and unobstructed standing room for the passengers while undressing and dressing.

35. The combination in a sleeping car and with the floor and wall, of fixed rigid seat backs or partitions located adjacent the wall and substantially at right angles thereto dividing the floor area into sections and alcove spaces adjacent the wall, an alcove space being at the end of each section; seats with upholsterings movable to form a lower berth foundation in each section; means for forming a horizontal upper berth entirely within each section and above the seats; and partitions or head boards in connection with the seat backs; the ends of the lower berths being shut off from the alcove spaces by the fixed seat backs; and said alcove spaces being open to the passage way and free and unobstructed above their floors affording suitable secluded standing room in each alcove space for the passengers of the adjacent section while undressing and dressing.

36. The combination in a sleeping car and with the floor and wall, of fixed rigid seat backs or partitions located adjacent the wall and substantially at right angles thereto dividing the floor area into sections, and alcove spaces adjacent the wall; an alcove space being at the end of each section; seats with upholsterings movable to form a lower berth foundation in each section; means for forming a horizontal upper berth entirely within each section and above the seats; a wash basin at the wall in each alcove space; and head boards or partitions in connection with the seat backs; the ends of the lower berths being shut off from the alcove spaces by the fixed seat backs; and said alcove spaces being open, free and unobstructed above their floors affording suitable secluded standing room in each alcove space for the passengers of the adjacent section while undressing, washing and dressing.

37. The combination in a sleeping car and with the floor and wall, of fixed rigid seat backs or partitions located adjacent the wall and substantially at right angles thereto dividing the floor area into sections, and alcove spaces adjacent the wall, an alcove space being at the end of each section; seats with upholsterings movable to form a lower berth in each section; means for forming a horizontal upper berth in each section and entirely therein; movable means for inclosing part of each alcove space to form a receptacle; and head boards or partitions in connection with the seat backs; the ends of the lower berths being shut off from the alcove spaces by the fixed seat backs; and said alcove spaces when the means for inclosing part of the alcove spaces are moved being open to the passage way and free and unobstructed above their floors affording suitable secluded standing room in each alcove space for the passengers of the adjacent section while undressing and dressing.

38. The combination in a sleeping car and with the floor and wall, of fixed rigid seat backs or partitions adjacent the wall and at right angles thereto dividing the floor area into sections, and alcove spaces adjacent the wall, an alcove space being at the end of each section; means for forming a lower berth in each section; means for forming an upper horizontal berth in each section and entirely within the same; and movable head boards or partitions in connection with the seat backs; the ends of the lower berths being shut off from the alcove spaces by the fixed seat backs and said alcove spaces being open to the fronts of the sections and free and unobstructed above their floors affording suitable secluded standing room in each alcove space for the passengers of the adjacent section while undressing and dressing.

39. The combination in a sleeping car and with the floor and wall, of fixed rigid seat backs or partitions adjacent the wall and at right angles thereto dividing the floor area into sections, and alcove spaces adjacent the wall, an alcove space being at the end of each section; means for forming a lower berth in each section; means for forming an upper horizontal berth in each section and entirely within the same; wash basins at the wall in the alcove spaces; and movable partitions or head boards in connection with the seat backs; the ends of the lower berths being shut off from the alcove spaces by the fixed seat backs; and said alcove spaces being open to the fronts of the sections and free and unobstructed above their floors affording suitable secluded standing room in each alcove space for the passengers of the adjacent section while undressing, washing and dressing.

40. The combination in a sleeping car and with the floor and wall, of fixed rigid seat backs or partitions adjacent the wall and at right angles thereto dividing the floor area into sections, and alcove spaces adjacent the wall, an alcove space being at the end of each section; means for forming a lower berth in each section; means for forming an upper horizontal berth in each section and entirely within the same; movable means for inclosing part of each alcove space to form a receptacle; and movable head boards or partitions in connection with the seat backs; the ends of the lower berths being shut off from the alcove spaces by the fixed seat backs; and said alcove spaces being open to the fronts of the sections and free and unobstructed above their floors affording suitable secluded standing room in each alcove space for the passengers of the adjacent section while undressing and dressing when the means for inclosing the alcove spaces are moved.

41. The combination in a sleeping car and with the floor and wall, of three fixed rigid seat backs in series at right angles to the wall and dividing the floor area into a section and an alcove space adjacent the wall; seats with upholstering movable to form a lower berth in the section; means for forming a horizontal upper berth located entirely within the section; and head boards or partitions in connection with the seat back remote from the alcove space, and the seat back at the side of the alcove space; the end of the lower berth being shut off from the alcove space by the fixed seat back, and said alcove space being open at the front and free and unobstructed above its floor affording suitable secluded standing room for the passengers of the section while undressing and dressing.

42. The combination in a sleeping car and with the floor and wall, of three fixed rigid seat backs in series at right angles to the wall and dividing the floor area into a section and an alcove space adjacent the wall; mean for forming a lower berth in the section; means for forming a horizontal upper berth located entirely within the section; and movable head boards or partitions in connection with the seat back remote from the alcove space, and the seat back at the side of the alcove space; the end of the lower berth being shut off from the alcove space by the fixed seat back, and said alcove space being open at the front and substantially free and unobstructed above its floor affording suitable secluded standing room for the passengers of the section while undressing and dressing.

43. The combination in a sleeping car and with the floor and wall, of three fixed rigid seat backs in series at right angles to the wall and dividing the floor area into a section and an alcove space adjacent the wall; means for forming a lower berth in the section; means for forming a horizontal upper berth located entirely within the section; and head boards or partitions in connection with the seat backs, one or more of the head boards or partitions being movable; the end of the lower berth being shut off from the alcove space by the fixed seat back, and said alcove space being open at the front and free and unobstructed above its floor affording suitable secluded standing room for the passengers of the section while undressing and dressing.

44. The combination in a sleeping car and with the floor and wall, of three fixed rigid seat backs in series at right angles to the wall and dividing the floor area into a section and an alcove space adjacent the wall; means for forming a lower berth in the section; means for forming a horizontal upper berth located entirely within the section; a wash basin at the wall in the alcove space; and head boards or partitions in connection with the seat back remote from the alcove space, and the seat back at the side of an alcove space, one of them being movable; the end of the lower berth being shut off from the alcove space by the fixed seat back, and said alcove space being open at the front and free and unobstructed above its floor affording suitable secluded standing room for the passengers of the section while undressing, washing and dressing.

45. The combination in a sleeping car and with the wall, of two fixed seat backs and a fixed partition in series at right angles to the wall and dividing the floor area into a section and an alcove space adjacent the fixed partition; seats within the section the upholsterings of which are movable to form a lower berth; means for forming a horizontal upper berth directly above the seats; and a head board or partition in connection with the fixed seat back remote from the alcove; the alcove being open and unobstructed and affording a secluded space for use by the passengers of the section while undressing and dressing; and the fixed seat back adjacent the alcove shutting off the lower berth therefrom.

46. The combination in a sleeping car and with the wall, of two fixed seat backs and a fixed partition in series at right angles to the wall dividing the floor area into a section and an alcove space adjacent the fixed partition; means for forming a lower berth in the section; means for forming a horizontal upper berth located entirely within the section; and a movable head board or partition in connection with the fixed seat back remote from the alcove; the alcove being open and unobstructed and affording a secluded space for the use of passengers while undressing and dressing; and the fixed seat back adjacent the alcove shutting off the lower berth therefrom.

47. The combination in a sleeping car and with the wall, of a fixed partition and two fixed seat backs or partitions in series located adjacent the wall and substantially at right angles thereto dividing the floor area into an alcove space adjacent the wall, and a section; means for forming a lower berth in the section; means for forming a horizontal upper berth and entirely within the section; and a head board or partition in connection with the seat back remote from the fixed partition; said fixed seat back at one side of the alcove space entirely shutting off the lower berth from the alcove and said alcove space being open and unobstructed affording suitable standing room for the passengers while undressing and dressing.

48. A sleeping car having fixed seat backs disposed at right angles to the car wall forming sections and alcove spaces; bulk-heads substantially in line with the seat backs; a lower berth and an upper berth located entirely within each section; and removable head boards or partitions supported on the seat backs and against the edges of the bulkheads; said alcove spaces being free and unobstructed above their floors, and shut off from the lower berths by the fixed seat backs.

49. The combination in a sleeping car and with the floor, walls and roof, of fixed partitions or seat backs located adjacent the walls and substantially at right angles thereto dividing the floor area into a passage way, sections, and alcove spaces adjacent the walls; arch rails at the top of the car above and adjacent the alcove spaces and parallel with the said fixed partitions or seat backs; partitions in connection with the said fixed partitions or seat backs; and means for forming lower and upper berths in the sections.

50. The combination in a sleeping car and with the floor, walls and roof, of fixed partitions or seat backs located adjacent the walls and substantially at right angles thereto dividing the floor area into a passage way, sections, and alcove spaces adjacent the walls; arch rails at the top of the car above and adjacent the alcove spaces and parallel with the said fixed partitions or seat backs; movable partitions in connection with said fixed partitions or seat backs; and means for forming lower and upper berths in the sections.

51. The combination in a sleeping car and with the floor, walls and roof, of fixed partitions or seat backs located adjacent the walls and dividing the floor area into a passage way, sections, and alcove spaces adjacent the walls; arch rails at the top of the car above and adjacent the alcove spaces; posts between the fixed partitions or seat backs and the arch rails or roof; movable partitions in connection with said fixed partitions or seat backs and posts; and means for forming lower and upper berths in the sections.

52. The combination in a sleeping car and with the floor, walls and roof, of fixed partitions or seat backs located adjacent the walls dividing the floor area into a passage way, sections, and alcove spaces adjacent the walls; arch rails at the top of the car adjacent the alcove spaces and located above and parallel with the fixed partitions or seat backs at one side of an alcove space; partitions in connection with the fixed partitions or seat backs below the arch rails; and means for forming lower and upper berths in the sections.

53. The combination in a sleeping car and with the floor, walls and roof, of fixed partitions or seat backs located adjacent the walls dividing the floor area into a passage way, sections, and alcove spaces adjacent the walls; arch rails at the top of the car adjacent the alcove spaces and at one side of an alcove space; movable partitions in connection with the fixed partitions or seat backs below the arch rails; and means for forming lower and upper berths in the sections.

54. The combination in a sleeping car and with the floor, walls and roof, of fixed partitions or seat backs located adjacent the walls dividing the floor area into a passage way, sections, and alcove spaces adjacent the walls; arch rails at the top of the car adjacent the alcove spaces and at one side of an alcove space; posts between the fixed partitions or seat backs and arch rails or roof; movable partitions in connection with the fixed partitions or seat backs and posts; and means for forming upper and lower berths in the sections.

55. The combination in a sleeping car and with the floor, walls and roof, of fixed partitions or seat backs located adjacent the walls dividing the floor area into a passage way, sections and alcove spaces adjacent the walls; bulk-heads adjacent the walls; rails above the alcove spaces; movable partitions in connection with the fixed partitions or seat backs; and means for forming lower and upper berths in the sections.

56. The combination in a sleeping car and with the floor, walls and roof, of fixed partitions or seat backs located adjacent the walls dividing the floor area into a passage way, sections and alcove spaces adjacent the walls; bulk-heads adjacent the walls; rails above the alcove spaces; posts between fixed partitions or seat backs and rails or roof; movable partitions in connection with the fixed partitions or seat backs, bulk-heads and posts; and means for forming lower and upper berths in the sections.

57. The combination in a sleeping car and with the floor, walls and roof, of fixed partitions or seat backs located adjacent the walls and dividing the floor area into a passage way, sections and alcove spaces adjacent the walls; posts in connection with the fixed partitions or seat backs supported at their upper ends by the top of the car; movable partitions in connection with the fixed partitions or seat backs and the posts; and means for forming lower and upper berths in the sections.

58. The combination in a sleeping car and with the floor, walls and roof, of fixed partitions or seat backs located adjacent the walls and dividing the floor area into a passage way, sections and alcove spaces adjacent the walls; posts in connection with fixed partitions or seat backs; rails extending from the roof, plates or deck sills to the upper ends of the posts; movable partitions in connection with the fixed partitions or seat backs and the posts; and means for forming lower and upper berths in the sections.

59. The combination in a sleeping car, of fixed partitions or seat backs located adjacent the walls and dividing the floor area into a central passage way, sections and alcove spaces; rails extending horizontally from the roof at or above the plates on each side toward the central passage way and located above partitions or seat backs; posts between fixed partitions or seat backs and the rails; partitions, one or more being movable; and means for forming lower and upper berths in the sections.

60. The combination in a sleeping car and with the floor and wall, of seat backs spaced apart to form sections and alcoves; upper and lower berths in the sections; posts in connection with the seat backs; and movable partitions in connection with the seat backs and positively engaging the posts; whereby in case of accident the partitions will be held in place.

61. The combination in a sleeping car having deck sills, of fixed partitions or seat backs located adjacent the walls and dividing the floor area into a passage way, sections, and alcoves; rails extending between the deck sills; posts between the rails or roof and the alcove spaces; movable partitions; and means for forming lower and upper berths in the sections.

62. The combination in a sleeping car and with the floor, wall and roof, of fixed partitions or seat backs dividing the floor area at the wall into a section and an alcove; posts in connection with said fixed partitions or seat backs remote from the alcove space and at one side of said alcove space; rails extending horizontally from the roof to the posts; partitions; and means for forming a lower and an upper berth in the section.

63. The combination in a sleeping car and with the floor and wall, of fixed rigid partitions or seat backs located adjacent the wall and dividing the floor area into sections and alcove spaces adjacent the wall; means for forming a lower berth in each section; a pivoted upper berth located entirely within each section; and movable partitions in connection with the fixed partitions or seat backs; the fixed seat backs shutting off the lower berths from the alcove spaces which latter are free and unobstructed above their floors affording secluded standing room for passengers while undressing and dressing.

64. The combination in a sleeping car and with the floor and walls, of fixed rigid partitions or seat backs located adjacent the walls and dividing the floor area into a passage way, sections and alcove spaces adjacent the walls; means for forming a lower berth in each section; a pivoted upper berth located entirely within each section; arch rails above alcove spaces; and movable partitions in connection with the fixed partitions or seat backs.

65. The combination in a sleeping car and with the floor and walls, of fixed rigid partitions or seat backs located adjacent the walls and dividing the floor area into a passage way, sections and alcove spaces adjacent the walls; means for forming a lower berth in each section; a pivoted upper berth located entirely within each section; rails above alcove spaces; posts between alcoves and rails or roof; and movable partitions in connection with the fixed partitions or seat backs and posts.

66. The combination in a sleeping car and with the floor and wall, of fixed rigid partitions or seat backs located adjacent the wall and dividing the floor area into sections and alcove spaces adjacent the wall; means for forming lower berths in the sections; pivoted upper berths in the sections, the main part of each being adapted to turn to a substantially vertical position adjacent the wall; and partitions in connection with the fixed partitions or seat backs.

67. The combination in a sleeping car and with the floor and wall, of fixed rigid partitions or seat backs located adjacent the wall and dividing the floor area into sections and alcove spaces adjacent the wall; means for forming lower berths in the sections; pivoted upper berths in the sections, the main part of each being adapted to turn to a substantially vertical position adjacent the wall; and movable partitions in connection with the fixed partitions or seat backs.

68. The combination in a sleeping car and with the floor and walls, of fixed rigid partitions or seat backs located adjacent the walls and dividing the floor area into a passage way, sections and alcove spaces adjacent the walls; means for forming lower berths in the sections; pivoted upper berths in the sections, the main part of each being adapted to turn to a substantially vertical position adjacent the wall; arch rails above alcove spaces; and movable partitions in connection with the fixed partitions or seat backs.

69. The combination in a sleeping car and with the floor and walls, of fixed rigid partitions or seat backs located adjacent the walls and dividing the floor area into sections and alcove spaces adjacent the walls; means for forming lower berths in the sections; pivoted upper berths in the sections, the main part of each being adapted to turn to a substantially vertical position adjacent the wall; rails above the alcove spaces; posts between the alcove spaces and rails or roof; and movable partitions in connection with the fixed partitions or seat backs and posts.

70. The combination in a sleeping car and with the floor and wall, of fixed rigid partitions or seat backs located adjacent the wall and dividing the floor area into sections and alcove spaces; means for forming lower berths in the sections; contracting upper berths in the sections; means for inclosing part of each alcove space to form a receptacle for bedding by day; and partitions or head boards in connection with the fixed partitions or seat backs.

71. The combination in a sleeping car and with the floor and wall, of fixed partitions or seat backs located adjacent the wall and dividing the floor area into sections and alcoves; means for forming lower berths in the sections; contracting upper berths in the sections; means for inclosing part of each alcove space to form a receptacle for bedding by day; and movable partitions or head boards in connection with the fixed partitions or seat backs.

72. The combination in a sleeping car and with the floor and walls, of fixed rigid partitions or seat backs located adjacent the walls and dividing the floor area into a passage way, sections and alcove spaces; means for forming lower berths in the sections; contracting upper berths in the sections; means for inclosing part of each alcove space to form a receptacle; arch rails; and movable partitions or head boards in connection with the fixed partitions or seat backs.

73. The combination in a sleeping car and with the floor and wall, of fixed rigid partitions or seat backs located adjacent the wall and dividing the floor area into sections and alcove spaces; means for forming lower berths in the sections; contracting upper berths in the sections; means for inclosing part of each alcove space to form a receptacle; rails above the alcove spaces; posts between the alcove spaces and rails or roof; and movable partitions or head boards in connection with the fixed partitions or seat backs and posts.

74. The combination in a sleeping car and with the floor and walls, of fixed rigid seat backs located adjacent the walls and dividing the floor area into a central passage way, sections and alcove spaces adjacent the walls; means for forming a lower berth in each section; bulk-heads substantially in line with the seat backs; hinged upper berths entirely within the sections adapted to fold up between the bulk-heads; and movable head boards or partitions in connection with seat backs and bulk-heads; the ends of the lower berths being shut off from the alcove spaces by the fixed seat backs; and said alcove spaces being open to the central passage way and free and unobstructed above their floors affording suitable standing room for passengers while undressing and dressing.

75. The combination in a sleeping car, of vertical seat backs located adjacent the car walls dividing the floor area into a central aisle, sections, and alcove spaces; movable means for inclosing part of each alcove space; bulk-heads above the seat backs; partitions in connection with the seat backs; seat upholsterings to form lower berths;

and a hinged upper berth in each section; the main parts of said upper berths being adapted to fold to substantially vertical positions adjacent the car walls.

76. The combination in a sleeping car and with the floor and wall, of fixed partitions or seat backs at right angles to the wall dividing the floor area into sections and alcove spaces adjacent the wall; means for forming lower and upper berths in the sections; movable partitions or head boards in connection with the fixed partitions or seat backs; and fixed wash stands and basins in the alcove spaces, each stand being substantially of the width of the alcove space and located adjacent the wall whereby toilet spaces are provided entirely isolated from the lower berths by the fixed partitions or seat backs.

77. The combination in a sleeping car and with the floor and wall, of fixed partitions or seat backs at right angles to the wall dividing the floor area into sections and alcove spaces adjacent the wall; means for forming lower and upper berths in the sections; rigid partitions or head boards in connection with the fixed partitions or seat backs; fixed wash stands and basins in the alcove spaces, each stand being substantially of the width of the alcove space and located adjacent the wall; and openable pockets above the wash stands.

78. The combination in a sleeping car and with the floor and walls, of fixed rigid partitions or seat backs located adjacent the walls and substantially at right angles thereto dividing the floor area into a central passage way, sections, and alcove spaces adjacent the walls; means for forming a lower berth in each section; means for forming a horizontal upper berth entirely within each section; and head boards or partitions in connection with the seat backs; the lower berths being entirely shut off from the alcove spaces by the fixed seat backs, the upper berths each being open at one end only to an alcove space, and said alcove spaces being free and unobstructed above their floors affording standing room for the passengers in undressing and dressing.

79. The combination in a sleeping car and with the floor and walls, of fixed rigid partitions or seat backs located adjacent the walls and substantially at right angles thereto dividing the floor area into a central passageway, sections, and alcove spaces adjacent the walls; means for forming a lower berth in each section; means for forming a horizontal upper berth entirely within each section; wash basins at the walls in the alcove spaces; and head boards or partitions in connection with the seat backs; the lower berths being entirely shut off from the alcove spaces by the fixed seat backs, and the upper berths each being open at one end only to an alcove space.

80. The combination in a sleeping car and with the floor and walls, of fixed rigid partitions or seat backs located adjacent the walls and substantially at right angles thereto dividing the floor area into a central passage way, sections, and alcove spaces; means for forming a lower berth in each section; means for forming a horizontal upper berth entirely within each section; movable means for inclosing part of each alcove space to form a receptacle by day; and head boards or partitions in connection with the seat backs; the lower berths being entirely shut off from the alcove spaces by the fixed seat backs, the upper berths each being open at one end only to an alcove space, and said alcove spaces being free and unobstructed above their floors.

81. The combination in a sleeping car and with the floor and wall, of fixed rigid partitions or seat backs located adjacent the wall and at right angles thereto dividing the floor area into sections and alcove spaces adjacent the wall; means for forming an upper berth and a lower berth in each section said upper berth being located in line with the lower berth, entirely within the section and not projecting into the alcove space; and head boards or partitions in connection with the seat backs; an alcove space being located at the end of each section, which space is entirely shut off from the lower berth by a seat back and open to one end only of an upper berth, whereby each berth is isolated from all other berths.

82. The combination in a sleeping car and with the floor and wall, of fixed seat backs or partitions located adjacent the wall and at right angles thereto dividing the floor area into sections and alcove spaces adjacent the wall; means for forming an upper berth and also a lower berth in each section; wash basins at the wall in the alcove spaces; and head boards or partitions in connection with the seat backs; an alcove space being located at the end of each section, which space is entirely shut off from the lower berth by a seat back and open to one end only of an upper berth, whereby each berth is isolated from all other berths.

83. The combination in a sleeping car and with the floor and wall, of fixed rigid partitions or seat backs located adjacent the wall dividing the floor area into sections and alcove spaces adjacent the wall; means for forming an upper berth and also a lower berth in each section; movable means for inclosing part of each alcove space by day; and head boards or partitions in connection with the seat backs; an alcove space being located at the end of each section, which space is entirely shut off from the lower berth by a seat back and open to one end only of an upper berth; whereby a space for storing bedding is provided.

84. The combination in a sleeping car and with the floor and wall, of fixed rigid partitions or seat backs located adjacent the wall and at right angles thereto dividing the floor area into sections and alcove spaces; means for forming an upper berth and also a lower berth in each section said upper berth being located in line with the lower berth, entirely within the section and not projecting into the alcove space; and movable head boards or partitions in connection with the seat backs; an alcove space being located at the end of each section, which space is entirely shut off from the lower berth by a seat back and open to one end only of an upper berth, whereby each berth is isolated from all other berths.

85. The combination in a sleeping car and with the floor and wall, of fixed rigid partitions or seat backs located adjacent the wall and dividing the floor area into sections and alcove spaces adjacent the wall; means for forming an upper berth and also a lower berth in each section; wash basins at the wall in the alcove spaces; and movable head boards or partitions in connection with the seat backs; an alcove space being located at the end of each section, which space is entirely shut off from the lower berth by a seat back and open to one end only of an upper berth, whereby each berth is isolated from all other berths.

86. The combination in a sleeping car and with the floor and wall, of fixed rigid seat backs or partitions located adjacent the wall and dividing the floor area into sections and alcove spaces; means for forming an upper berth and also a lower berth in each section; movable means for inclosing part of each alcove space by day; and movable head boards or partitions in connection with the seat backs; an alcove space being located at the end of each section, which space is entirely shut off from the lower berth by a seat back and open to one end only of an upper berth, whereby each berth is isolated from all other berths.

87. The combination in a sleeping car and with the wall, of fixed seat backs or partitions arranged in series at right angles to the wall and dividing the floor area into sections, and alcove spaces adjacent the wall; seats in the sections with movable upholsterings adapted to form lower berths; a hinged and folding upper berth in each section and entirely therein above the seats; and means for entirely shutting off each alcove space on one side thereof from an adjacent section, the other side being open to the upper berth only when adapted for use; the fixed seat back or partition shutting off the lower berth from said alcove space.

88. The combination in a sleeping car and with the wall, of fixed seat backs or partitions arranged in series at right angles to the wall and dividing the floor area into sections, and alcove spaces adjacent the wall; seats in the sections with movable upholsterings adapted to form lower berths; a hinged or pivoted upper berth in each section and located entirely therein above the seats and not projecting into the alcove space; and rigid movable head boards or partitions in connection with the seat backs or partitions for entirely shutting off each alcove space on one side thereof from an adjacent section, the other side being open to the upper berth only when adapted for use; the fixed seat back or partition shutting off the lower berth from said alcove space.

89. The combination in a sleeping car and with the wall, of fixed seat backs or partitions arranged in series at right angles to the wall and dividing the floor area into sections, and alcove spaces adjacent the wall; seats in the sections with movable upholsterings adapted to form lower berths; a hinged or pivoted upper berth in each section and entirely therein above the seats; wash basins at the wall in the alcove spaces; and means for entirely shutting off each alcove space on one side thereof from an adjacent section, the other side being open to the upper berth only when adapted for use; the fixed seat back or partition shutting off the lower berth from said alcove space.

90. The combination in a sleeping car and with the floor and walls, of fixed rigid seat backs located adjacent the walls and substantially at right angles thereto dividing the floor area into a central passage way, sections, and alcove spaces adjacent the walls; seats in the sections the upholstering of which can be transformed into lower berth foundations; upper berths each located entirely within a section and not projecting into an alcove space; and movable head boards or partitions extending above the upper berths when lowered in connection with part of the seat backs only; the rigid seat backs entirely shutting off the alcove spaces from the lower berths, said alcove spaces being free and unobstructed above their floors, and the ends of the upper berths only being open to the alcove spaces above the seat backs.

91. The combination in a sleeping car and with the floor and walls, of fixed rigid seat backs located adjacent the walls and dividing the floor area into a central passage way, sections, and alcove spaces adjacent the walls; seats in the sections the upholstering of which can be transformed into lower berth foundations; upper berths each located entirely within a section and not projecting into an alcove space; head boards or partitions extending above the upper berths when lowered in connection with part of the seat backs only; and narrow head boards in connection with the other seat backs; the rigid seat backs and narrow head boards entirely shutting off the alcove spaces from the lower berths, said alcove spaces being free and unobstructed above their floors and the ends of the upper berths only being open to the alcove spaces above the seat backs and narrow head boards.

92. The combination in a sleeping car and with the floor and wall, of fixed seat backs or partitions forming a section, upholstered seats adapted to form a lower berth foundation, means for forming an upper berth above the seats and located entirely within the section and not projecting into an alcove space, an alcove space adjacent one of the seat backs or partitions, and two head boards or partitions entirely shutting off the end of the section remote from the alcove space and the side of the alcove space remote from the section, so the lower berth is shut off from the alcove space by the fixed seat back, each berth isolated from the other berth and access to the upper berth only from the alcove is possible.

93. In a sleeping car, in combination, a pair of permanent facing seats with fixed backs, the cushions and upholstering of which seats are movable to form a bed foundation, a folding berth directly above and in line with the pair of seats, an alcove space back of one of the seats, a wash basin in the alcove space, and a movable partition for closing the end of the folding berth remote from the alcove space when the said berth is lowered; said alcove space being shut off from the lower berth by a fixed seat back.

94. The combination in a sleeping car and with the floor and wall, of two seat backs and a partition spaced apart to form a section and an alcove space adjacent one of the seat backs; means for forming upper and lower berths in the section said upper berth being located entirely within the section and not projecting into the alcove space; and a partition for entirely shutting off the end of the section remote from the alcove space, so access to the upper berth is provided from the alcove space above the seat back.

95. The combination in an alcove sleeping car, of rigid fixed seat backs and bulk-heads, the same being located in vertical planes and spaced to form alcove spaces and sections; seats with upholstering adapted to form lower berths and upper berths located entirely within the sections; and movable partitions or head boards, one type shutting off sections from alcove spaces and the other type closing the openings between the tops of seat backs and the ends of upper berths when arranged for use, whereby access may be had to each upper berth from an alcove space at one end only; said alcove spaces being free and unobstructed above their floors and shut off from the lower berths by the seat backs.

96. The combination in a sleeping car and with the wall and floor, of rigid fixed seat backs at right angles to the wall dividing the floor area into sections and alcove spaces; seats with upholstering adapted to form lower berths in the sections; upper berths each located entirely within a section and not projecting into an alcove space; and movable partitions or head boards in connection with the seat backs at one end of each section which entirely shut off the alcove spaces from the sections upon one side of each alcove space, the lower berth of a section being shut off from the alcove space by a rigid fixed seat back; whereby each berth is isolated from every other berth.

97. The combination in a sleeping car and with the floor and wall, of fixed rigid partitions or seat backs adjacent the wall spaced apart to form a section and alcove space; means for forming an upper berth and a lower berth in the section; a rigid partition in connection with the seat back remote from the alcove space; a wash basin in the alcove space; a narrow head board, as 91, in connection with the seat back between the section and alcove space; and the side of the alcove space remote from the section being bounded by a rigid partition.

98. A car having walls, a floor, two fixed seat backs S S forming a section at the wall, seats in the section, a hinged upper berth having its ends in the same vertical planes as the seat backs, a permanent bulk-head closing one end of the upper berth when raised, a partition in connection with the seat back and bulk-head, an alcove space adjacent the section and open to the upper berth when lowered above the fixed seat back S, and means for entirely closing the side of the alcove space remote from the section.

99. A car having a wall, a floor, two fixed partitions or seat backs forming a section adjacent the wall, an alcove space adjacent the section, means for forming lower and upper berths in the section, means for closing the end of the section remote from the alcove space, and a guard for the upper berth, access to said upper berth being possible from the alcove space and at the end of the upper berth.

100. The combination in a sleeping car and with the floor and wall, of fixed rigid partitions or seat backs located adjacent the wall and at right angles thereto dividing the floor area into a section and an alcove space adjacent the wall; means for forming a lower berth in the section; means for forming an upper berth located entirely within the section; means for entirely shutting off the end of the section remote from the alcove space; and means for closing the side of the alcove remote from the section; the rigid seat back or partition shutting off the alcove space from the lower berth and one end of the upper berth being open to the said alcove space.

101. A car having permanent seats with suitable cushions and back upholstering arranged in pairs facing each other against the walls and upon opposite sides of a central aisle; alcoves between the seat backs, said alcoves being open to the aisle and unobstructed when in use by passengers while undressing and dressing; upper berths in line with each pair of seats; means entirely shutting off an alcove on one side from an adjacent section; and means entirely shutting off the section at the other side of the alcove below the upper berth when in a horizontal position for use.

102. A car having permanent seats with suitable cushions and back upholstering arranged in pairs facing each other adjacent the walls and upon opposite sides of a central aisle; alcoves between the seat backs, said alcoves being open to the aisle and unobstructed when in use by passengers for undressing and dressing; pivoted and folding upper berths in line with each pair of seats; means entirely shutting off an alcove on one side from an adjacent section; and means for entirely shutting off the section at the other side of the alcove below the upper berth when in a horizontal position for use.

103. A car having permanent seats with suitable cushions and back upholstering arranged in pairs facing each other adjacent the walls and upon opposite sides of a central aisle; alcoves between the seat backs, said alcoves being open to the aisle and unobstructed when in use by passengers while undressing and dressing; upper berths in line with each pair of seats; movable means entirely shutting off an alcove on one side from an adjacent section; and movable means entirely shutting off the section at the other side of the alcove below the upper berth when in a horizontal position for use.

104. A car having permanent seats with backs arranged in pairs facing each other adjacent the walls and upon opposite sides of a central aisle; alcoves between the seat backs, said alcoves being open and unobstructed when in use by passengers while undressing and dressing; upper berths in line with each pair of seats; and head boards or partitions in connection with and above the seat backs; the head board or partition at one side of an alcove entirely closing said alcove from an adjacent pair of seats, and the head board or partition at the other side of said alcove extending from the seat back upwardly as far as the upper berth when in a horizontal position for use; whereby an opening to one upper berth only and from an alcove is provided, and each berth isolated.

105. A car having permanent seats with backs arranged in pairs facing each other adjacent the walls and upon opposite sides of a central aisle; alcoves between the seat backs, said alcoves being open and unobstructed when in use by passengers while undressing and dressing; pivoted upper berths in line with the pairs of seats; bulkheads closing the ends of the upper berths when folded; and head boards or partitions in connection with and above the seat backs; the head board or partition at one side of an alcove entirely closing said alcove from an adjacent pair of seats, and the head board or partition at the other side of said alcove extending from the seat back upwardly as far as the upper berth when in a horizontal position for use; whereby an opening to one upper berth only and from an alcove is provided, and each berth isolated.

106. A car having permanent seats with backs arranged in pairs facing each other adjacent the walls and upon opposite sides of an open central aisle; alcoves between the seat backs, said alcoves being open and unobstructed for use by passengers while undressing and dressing; upper berths in line with each pair of seats; removable head boards in connection with part of the seat backs which entirely close the alcoves from adjacent pairs of seats; and removable narrow head boards in combination with the remaining seat backs for closing the spaces between the said seat backs and the upper berths when in position for use, whereby an opening from an alcove to one upper berth only at the end thereof is provided.

107. In a sleeping car, in combination, two pair of permanent seats with suitable cushions and upholstering arranged at right angles to the car wall, adjacent seats of the two pair being back to back and said backs spaced apart to form an alcove, said alcove being open at the front and unobstructed when adapted for use by passengers while undressing and dressing; upper berths in line with each pair of seats; means entirely shutting off the alcove on one side from an adjacent pair of seats and an upper berth; and means entirely shutting off the section at the other side of the alcove and below the upper berth when in horizontal position for use.

108. In a sleeping car, in combination, a pair of permanent seats having backs arranged at right angles to the car wall; suitable movable cushions and upholstering to form the lower berth; an upper berth in line with the pair of seats and located entirely within the section; a permanent partition located a suitable distance from one of the seat backs and extending upwardly to the plate or roof, the space between said seat back and partition constituting an alcove; and means at the other side of the alcove entirely shutting off said alcove from the lower berth when the upper berth is in a horizontal position for use; whereby access to the end of the upper berth and from the alcove is made possible, and the lower berth isolated from the alcove.

109. In a sleeping car, in combination, a pair of permanent seats having backs arranged at right angles to the car wall; suitable movable cushions and upholstering to form a lower berth; a pivoted upper berth located entirely within the section; bulk heads between which the upper berth closes; a permanent partition located a suitable distance from one of the seat backs and extending upwardly to the plate or roof, the space between said seat back and partition constituting an alcove; and means at the other side of the alcove entirely shutting off said alcove from the lower berth when the upper berth is in a horizontal position for use.

110. The combination in a sleeping car, of permanent seat backs and bulk heads substantially in the planes of the seat backs, both arranged at right angles to the wall of the car and forming a plurality of sections and alcoves; removable seat cushions and back upholstering in each section adapted to form a lower berth; upper berths hinged at their inner edges between the bulkheads and adapted to be lowered to horizontal positions for use; rigid head boards adapted to entirely shut off the alcoves from the sections at one side of an alcove; and means for closing the spaces between the tops of the seat backs and the upper berths when lowered to horizontal positions at the other sides of the alcoves; whereby access can be had to one upper berth only from each alcove.

111. In a sleeping car, in combination, two pair of permanent seats having fixed back boards arranged at right angles to the car wall, adjacent seats of the two pair being back to back and the back boards spaced apart to form an alcove, the seats of each pair being provided with upholstering which is extensible to form lower sleeping berths; bulkheads extending upwardly from the seat backs; a folding berth directly above each pair of seats and when folded one end being closed by a bulk head; a rigid partition closing the alcove on one side above a seat back from the adjacent upper and lower berths; and a partition closing the space at the opposite side of the alcove between the seat back and the upper berth only when the berth is lowered; whereby access is possible to one upper berth only from an alcove.

112. A car having adjacent the wall thereof permanent seats embracing backs and removable cushions and back upholstering arranged in pairs facing each other, the several pairs being spaced apart to form alcoves between adjacent seat backs; bulkheads above the seat backs and substantially in line therewith; hinged upper berths in line with each pair of seats adapted to be lowered to horizontal positions; rigid head boards adapted to entirely shut off one side of each alcove from the pair of seats and upper berth on one side thereof; and means for closing the spaces between the tops of the seat backs and the upper berths when lowered at the other sides of the alcoves; whereby an opening from an alcove to each upper berth on one side of said alcove only is provided.

113. The combination in a sleeping car, of permanent seat backs and bulkheads, both arranged at right angles to the wall of the car and forming a plurality of sections and alcoves; removable seat cushions and back upholstering in each section adapted to form a lower berth; upper berths hinged at their inner edges between the bulkheads and adapted to be lowered to horizontal positions for use; removable head boards or partitions in connection with part of the seat backs adapted to entirely shut off the alcoves from the sections at one side of an alcove; and narrow removable head boards or partitions for closing the spaces between the tops of the seat backs and the upper berths, when lowered to horizontal positions at the other sides of the alcoves; whereby access can be had to one upper berth only from each alcove.

114. The combination in a sleeping car, of permanent seat backs and bulkheads, both arranged at right angles to the wall of the car and forming a plurality of sections and alcoves; removable seat cushions and back upholstering in each section adapted to form a lower berth; upper berths hinged at their inner edges between the bulkheads and adapted to be lowered to horizontal positions for use; movable head boards or partitions upon part of the seat backs and engaging bulkheads adapted to entirely shut off the alcoves from the sections at one side of an alcove; and movable narrow head boards upon other seat backs for closing the spaces between the tops of the seat backs and the upper berths, when lowered to horizontal positions, at the other sides of the alcoves, for the purpose set forth.

115. In a sleeping car, in combination, two pair of permanent seats having fixed back boards arranged at right angles to the car wall, adjacent seats of the two pair being back to back and the back boards spaced apart to form an alcove, the seats of each pair being provided with upholstering which is extensible to form lower sleeping berths; bulkheads above the seat backs; a folding berth directly above each pair of seats and when folded one end being closed by a bulkhead; a movable head board or partition upon a seat back and closing the alcove on one side above said seat back from the adjacent upper and lower berths; and a movable partition or head board upon the other seat back closing the space at the opposite side of the alcove between the said seat back and the upper berth only when the berth is lowered; whereby the lower berths are entirely shut off from the alcoves and access is possible to one upper berth only from an alcove.

116. A car having adjacent the wall thereof permanent seats, embracing backs and movable cushions and back upholstering, arranged in pairs facing each other, the several pairs being spaced apart to form alcoves between adjacent seat backs; bulk heads above the seat backs; hinged upper berths in line with each pair of seats and adapted to be lowered to horizontal positions; movable head boards or partitions upon part of the seat backs adapted to entirely shut off one side of each alcove from the pair of seats and upper berth on one side thereof; and narrow head boards or partitions upon other seat backs for closing the spaces between the tops of the seat backs and the upper berths when lowered at the other sides of the alcoves.

117. A car having adjacent the wall thereof permanent seats arranged in pairs facing each other, the several pairs being spaced apart to form alcoves between adjacent seat backs; hinged upper berths in line with each pair of seats and adapted to be lowered to horizontal positions; a guard secured to the outer edge of each upper berth and adapted to be supported at its free edge from the top of the car; rigid head boards adapted to entirely shut off one side of each alcove from the pair of seats and upper berth on one side thereof; and means for closing the spaces between the tops of the seat backs and the upper berths when lowered at the other sides of the alcoves; whereby the upper berth space is open at one end and to the alcove from which access to said upper berth is provided.

118. A car having adjacent the wall thereof permanent seats arranged in pairs facing each other, the several pairs being spaced apart to form alcoves between adjacent seat backs; upper berths in line with each pair of seats adapted to occupy horizontal positions when in use; a guard secured to the outer edge of each upper berth and adapted to be supported at its free edge from the top of the car; means adapted to entirely shut off one side of each alcove from the pair of seats and upper berth on one side thereof; and means entirely shutting off the lower berths from the alcoves at the other sides when the upper berths are in position; whereby the upper berth space is open at one end to an alcove from which access to said upper berth is provided.

In testimony whereof I affix my signature, in presence of two witnesses.

FRANK E. STEBBINS.

Witnesses:
A. R. TOWNSHEND,
D. W. EDELIN.